United States Patent [19]

Norden-Paul et al.

[11] Patent Number: 5,410,704
[45] Date of Patent: Apr. 25, 1995

[54] TABLE MODIFIABLE EDIT FUNCTIONS WITH ORDER-EFFECTIVE EDIT RULES

[75] Inventors: Ronald Norden-Paul; Stanley Person, both of Mesa; Robert A. Wissinger, Scottsdale, all of Ariz.

[73] Assignee: Motorola, Inc., Schaumburg, Ill.

[21] Appl. No.: 26,241

[22] Filed: Mar. 1, 1993

Related U.S. Application Data

[63] Continuation of Ser. No. 443,617, Nov. 30, 1989, abandoned.

[51] Int. Cl.6 .................. G06F 15/40; G06F 15/42
[52] U.S. Cl. ............................ 395/700; 395/600; 364/DIG. 2; 364/922; 364/922.3; 364/963.3; 364/974; 364/974.3
[58] Field of Search .................. 395/600, 700

[56] References Cited

U.S. PATENT DOCUMENTS

| | | | |
|---|---|---|---|
| 4,553,205 | 11/1985 | Porchia | 364/300 |
| 4,791,561 | 12/1988 | Huber | 364/300 |
| 4,815,029 | 3/1989 | Barker et al. | 364/900 |
| 5,133,068 | 7/1992 | Crus et al. | 395/600 |

Primary Examiner—Kevin A. Kriess
Assistant Examiner—Kakali Chaki
Attorney, Agent, or Firm—Walter W. Nielsen; S. Kevin Pickens

[57] ABSTRACT

In a data processing system in which data is entered and validated, a method for performing edit procedures, according to which edit procedures are associated with input attributes via a table. The edit procedures are applied in a predetermined, yet modifiable order.

1 Claim, 16 Drawing Sheets

FIG. 3

METRO MEDICAL CENTER | JAN 07 14:00
BLOOD GAS RESULTS READY | JACKSON, DONALD M. 60 M 9NBURN
 | ATTENDING: CHARLES RICE, M.D. MR#: 87-19-46

SECTIONS: FLOWSHEET ORDERS NCP I&O LABS VENTILLATOR
FORMS: MEDS VITALS ASSESSEMENT LABS R.T. KARDEX

| | 01/07 07:00 | 08:00 | 09:00 | 10:00 | 11:00 | 12:00 | 13:00 | 14:00 | 15:00 | 16:00 |
|---|---|---|---|---|---|---|---|---|---|---|
| TEMP | 98.6 | | | | | | | | | |
| HEART RATE | 90 | 80 | 60 | 89 | 95 | 96 | 100 | 85 | | |
| BP SYSTOLIC/DIASTOLIC | 100/60 | 105/65 | 110/60 | 160/90 | 160/95 | 120/80 | 150/60 | 100/80 | | |
| (MEAN)(SOURCE) | (73) | (78) | (76) | (113) | (116) | (93) | (90) | (85) | | |
| PA SYSTOLIC/DIASTOLIC | | 30/10 | | 30/10 | | 35/15 | | 30/10 | | |
| (MEAN) | | (17) | | (17) | | (22) | | (17) | | |
| IIEMO C.V.P. | | 8 | | 8 | | 10 | | 8 | | |
| C.O. | | 4.0 | | | | 5.2 | | | | |
| C.I. | | 2.18 | | | | 2.84 | | | | |
| S.V.R. | | 1180 | | | | 1080 | | | | |

ADD PARAMETER   PAGE DOWN   CLOSE CHART

SCROLL

TABLE MODIFIABLE EDIT FUNCTIONS WITH ORDER-EFFECTIVE EDIT RULES

This application is a continuation of prior application Ser. No. 07/443,617, filed on Nov. 30, 1989, now abandoned.

The present invention is related to the following inventions, all assigned to the assignee of the present invention:

System Control Structure of a Hospital Information System and Method of Using Same, having Ser. No. 116,614, and filed on Nov. 3, 1987, now abandoned.

Method for Generating Patient-Specific Flowsheets by Adding/Deleting Parameters, having Ser. No. 116,611, and filed on Nov. 3, 1987, now U.S. Pat. No, 4,878,175;

Clinical Task List with Charting Through the Task List onto Underlying Form and Automatic Updating of Task List, having Ser. No. 268,822, and filed on Nov. 7, 1988, now U.S. Pat. No. 5,077,666.

Clinical Task List with Charting onto Underlying Form and Automatic Updating of Task List, having Ser. No. 268,323, and filed on Nov. 7, 1988, now U.S. Pat. No. 5,072,383;

Method For Generating A Display, having Ser. No. 322,740, and filed on Mar. 13, 1989, now abandoned, and continuation Ser. No. 07/540,382, now U.S. Pat. No. 5,208,907;

Electronic Data Storage Interface, having Ser. No. 408,178 and filed on Sep. 15, 1989, now U.S. Pat. No. 5,208,907;

Method for Updating Data in a Database, having Ser. No. 07/408,167 and filed on Sep. 15, 1989, now abandoned;

A Method for Displaying Information from an Information Based Computer System, having Ser. No. 407,979, and filed on Sep. 15, 1989, now abandoned;

Spreadsheet Cell having Multiple Data Fields, having Ser. No. 408,166, and filed on Sep. 15, 1989, now abandoned;

A Method for Displaying Information from an Information Based Computer System, having Ser. No. 407,836, and filed on Sep. 15, 1989, now U.S. Pat. No. 5,325,478;

Method for Storing a Transaction in a Distributed Database System, having Ser. No. 408,164, and filed on Sep. 15, 1989, now abandoned;

A Method of Forming a Spreadsheet Display, having Ser. No. 407,972, and filed on Sep. 15, 1989, now abandoned;

Data Storage Audit Trail, having Ser. No. 409,230, and filed on Sep. 15, 1989, now abandoned;

Method for Handling Recursive Calculations, having Ser. No. 07/435,396 and filed on Nov. 13, 1989, now abandoned;

Attribute Import Between Nodes of a Directed Graph, having Ser. No. 07/443,616 and filed on Nov. 30, 1989, now abandoned;

Attribute Export Between Nodes of a Directed Graph, having Ser. No. 07/443,621 and filed on Nov. 30, 1989, now abandoned;

Association of Edit Functions With Attributes, having Ser. No. 07/443,623 and filed on Nov. 30, 1989, now abandoned;

Association of Edit Functions With Attribute Types, having Ser. No. 07/443,613 and filed on Nov. 30, 1989, now abandoned;

Association of Default Functions With Attributes, having Ser. No. 07/443,629 and filed on Nov. 30, 1989, now abandoned;

Association of Calculation Functions With Attributes, having Ser. No. 07/443,628 and filed on Nov. 30, 1989, now abandoned;

Association of List Functions With Attributes, having Ser. No. 07/443,622 and filed on Nov. 30, 1989, now abandoned;

Association of Cross-Field Edit Functions With Attributes, having Ser. No. 07/443,614 and filed on Nov. 30, 1989, now abandoned; and Association of Combinations of Default, Edit, Calculation, and List Functions With Attributes, having Ser. No. 07/443,630 and filed on Nov. 30, 1989, now abandoned.

TECHNICAL FIELD

This invention relates generally to data processing systems and processes, and, in particular, to a data processing system in which various edit procedures may be enabled in a predetermined, yet modifiable order as data is entered into one or more fields of a form.

PROBLEMS ADDRESSED BY THE INVENTION

The present invention has utility in data processing systems in which various routine procedures are invoked in response to user input. The user input may take the form of one or more "attributes", i.e. the smallest piece of useful data in a data object (i.e. data field in the database). Refer to Glossary appended hereto as Appendix A.

Traditionally, libraries are built for routine procedures (such as defaults, edits, calculations, and lists, which hereinafter may be referred to DECL's). Each function is written to process one particular attribute. All applications must call the appropriate functions for the attributes they use. When a library function is changed, added, or deleted, all applications that use the function (i.e. the attribute the function is associated with) must be correctly modified, recompiled, and retested.

Using the present invention, routine functions are associated with attributes and are automatically invoked by a separate process. The application never deals with them. Also routine functions can be associated with more than one attribute or an attribute type, so that they can be reused.

As a result, responsibility for routine tasks is removed from the applications. There is a corresponding reduction in errors, maintenance time, implementation time, and design time. There is also a reduction in complexity, because DECL's are reuseable (can be used with more than one attribute), so not as many are needed. A library of nodes, or program parts, is built up as applications are constructed. In addition, the code is more readable and understandable.

By reducing the number of DECL's procedures in a system, maintainability is enhanced, and the implementation of applications is speeded up. Instead of writing new DECL's procedures, the applications designer can reuse existing ones. This increases programmer productivity, since the applications programmer is insulated from details he or she doesn't need to know.

Further, the present invention enhances the ability to customize and configure systems for different customer installations.

It is known to utilize UNIX shell script in the form of a collection of separate and independent processes combined (e.g., filters and pipes) to achieve a particular purpose. However, UNIX shell script is significantly different from the methods disclosed by the present invention. UNIX is oriented to a line-by-line style of interface where the control thread is controlled by the program rather than by a user with a mouse-driven interface. Also, UNIX is not field-oriented but rather is oriented to a stream of data.

It is also known to associate routine procedures with attributes in a form definition as part of related code. However, such routine procedures are tightly-coupled to the attributes. They are not reuseable in the sense described herein regarding the present invention.

It is also known to associate routine procedures with attributes in the form of a table in a standard relational database such as SQL. Again, however, such routine procedures are tightly-coupled to the attributes and are not reuseable.

BRIEF SUMMARY OF INVENTION

Routine procedures (such as defaults, edits, calculations, and lists) are associated with attributes via a table and are executed by an applications manager process in response to events. All of the routine procedures are transparent to the application. The application doesn't have to know they exist.

Also routine procedures can be written so that they can process more than one attribute or any attribute of a particular type, thus reducing the number of procedures required.

The present invention can be used in any system that performs processing automatically on data entry, i.e. wherein the processing is "data driven".

Accordingly, it is an object of the present invention to provide a software architecture which removes responsibility for routine procedures from the applications.

It is another object of the present invention to provide a software architecture in which edit procedures are associated with attributes via a table and are executed by an applications manager process in a predetermined priority in response to events.

These and other objects are achieved in accordance with a preferred embodiment of the invention by providing in a data processing system in which data is input and validated by a plurality of edit procedures, a method for performing the edit procedures, wherein the method comprises the steps of (a) categorizing the input data into one of a plurality of attributes; (b) providing a table of edit procedures for the plurality of attributes, including at least two edit procedures for one of the plurality of attribute types; (c) when a given attribute is input, entering a routine to check the table to determine whether it contains any edit procedures for the attribute; (i) if so, applying the edit procedures to the attribute in a predetermined order; and (ii) if not, exiting the routine.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 3 shows a typical Flowsheet information screen, illustrating both measured and calculated patient parameters in the automated clinical records system shown in FIGS. 1 and 2.

BACKGROUND DESCRIPTION OF THE DATA PROCESSING SYSTEM

Patient Care Process

FIGS. 1–4 provide background description of a system in which the present invention has been implemented and provides utility. Such system is further described in the Related Inventions cited above. However, it should be understood that the present invention has broad utility in any data processing system which must be capable of a high degree of customization and is not intended to be limited to implementations such as those relating to the system shown in FIGS. 1–4.

Figure 1:
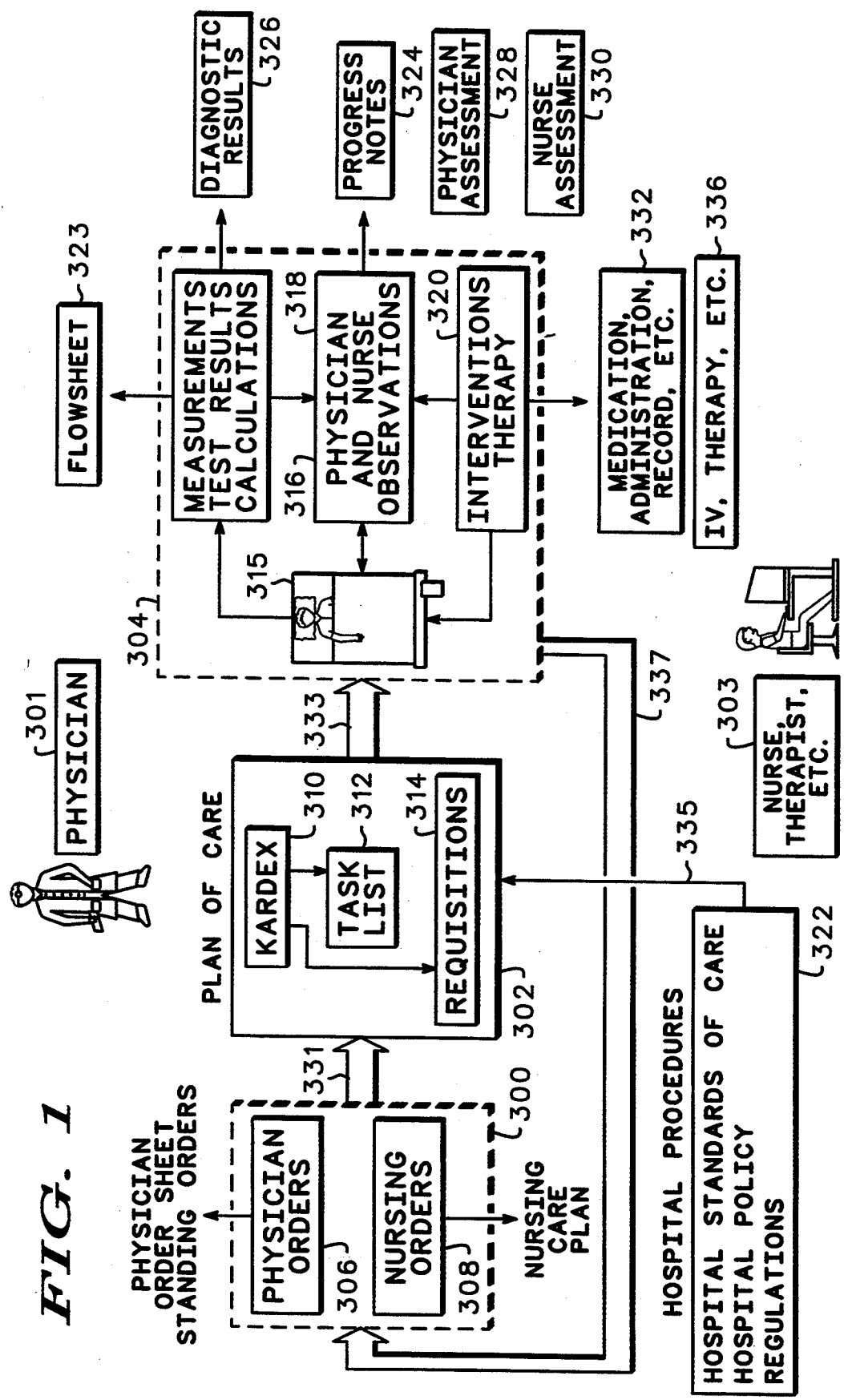
FIG. 1 shows a block diagram illustrating, in general, the patient care process in a typical hospital environment.

FIG. 1 shows a block diagram illustrating in general the patient care process in a typical hospital environment.

Physician 301 is responsible for the management and care of the patient 315 throughout the hospital stay. On admitting a patient to the hospital a physician will assess the patient and arrive at a diagnosis. Based on the diagnosis the physician will write a plan of care in his progress notes and generate a list of physician orders 306 to be executed by nursing and other hospital personnel 303. The physician's orders 306 are the source for the Kardex 310, Task List 312, Requisitions 314, and other associated forms that assist in the overall execution of the patient care plan 302. Nursing orders 308 also generate corresponding interventions in the Kardex 310 and Task List 312.

Other interventions in the Kardex 310 and Task List 312 are mandated by hospital procedures 322, which include hospital standards of care, hospital policy, and regulations. The nurse or other hospital personnel 303 executes the orders as written in the Kardex 310 and Task List 312 and then charts on the appropriate forms to satisfy the requirement for providing necessary documentation.

Other forms such as Flowsheet 323 and Diagnostic Results 326 document specific measurements, tests results, and/or calculations 316 performed directly on the patient or on the patient's tissue, fluids, etc. Similarly, interventions and other therapy 320 are documented on a Medication Administration Record form 332 and other forms.

The nurse and physician observe the patient 315 and the results of interventions and therapy 320 and document their observations 318 in progress notes 324 and other associated forms.

From the observations 318 and progress notes 324 the physician 310 or nurse 303 writes a new set of orders 300 corresponding to the present condition of the patient 315.

System Hardware

Figure 2:
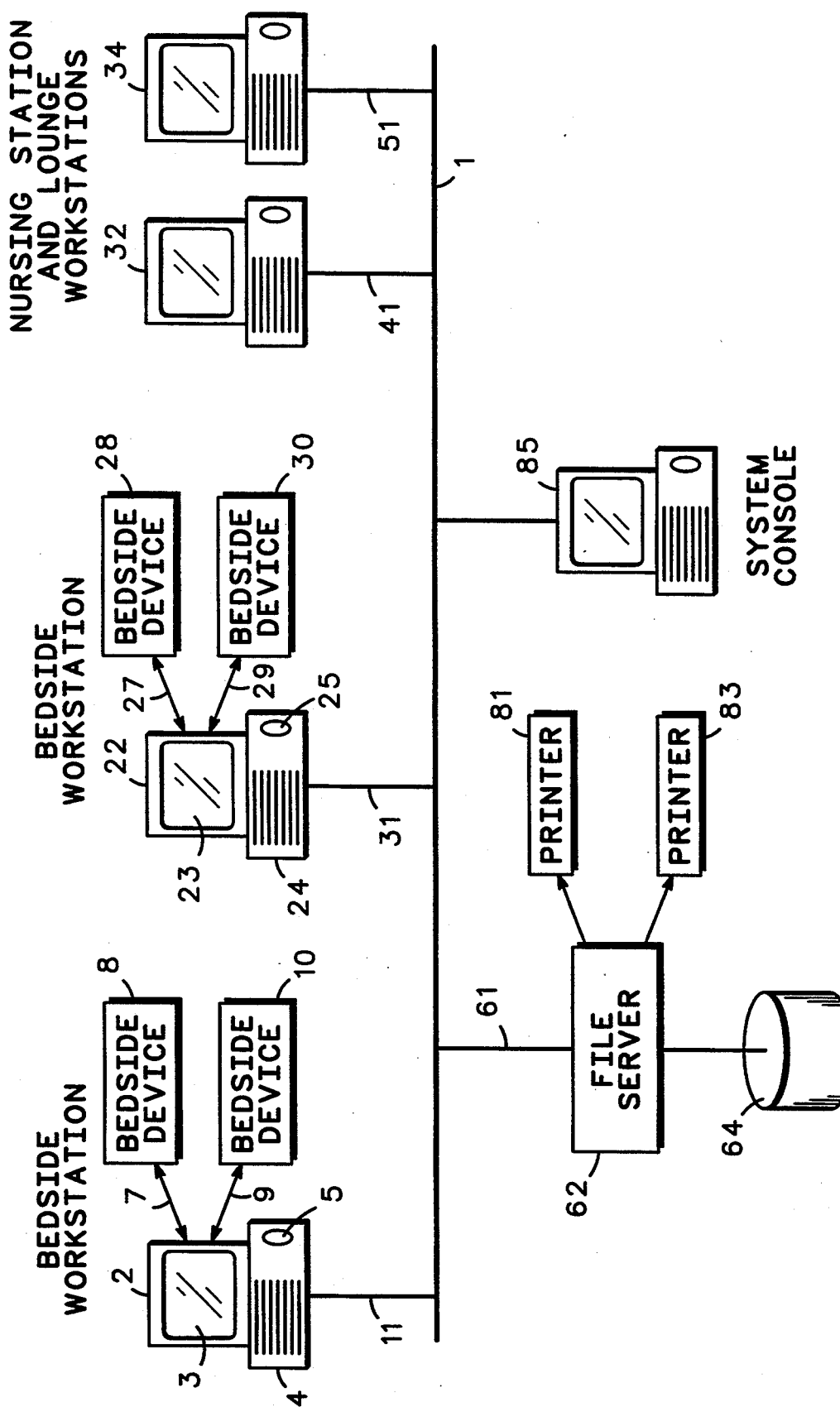
FIG. 2 shows a block diagram illustrating a preferred embodiment of a data processing system incorporating the method of the present invention.

Referring now to FIG. 2, a block diagram is shown of a typical hardware configuration for implementing the automated clinical records system of the present invention. FIG. 2 shows a distributed computer system comprising a plurality of workstations or terminals 2, 22, 32, 34 and 85 coupled to a local area network (LAN) 1.

The system is typically installed for use in a nursing care unit, such as an intensive care unit, in a hospital or clinic. Each of terminals 2 and 22 is located at the patient bedside. One terminal may be dedicated to the use of a single patient, or it may be used for multiple patients. Terminals 32 and 34 may be located at a nursing station or nurse/physician lounge area. Terminal 85 is the system console which is used by a system administrator to configure and maintain the system and to provide additional services, such as displaying system status and error messages, archiving, and performing diagnostics.

Each bedside workstation or terminal, such as terminal 2, includes a video display unit with a viewable screen 3 for displaying information to the viewer; a housing 4 containing computing, data storage, and communications equipment and having associated with it a keyboard and pointing device such as a mouse 5; and connections 7 and 9 to one or more bedside devices 8 and 10. Bedside devices 8 and 10 may take the form of patient monitoring equipment suitable for the patient undergoing care, such as an EKG monitor, respiratory monitor, etc. Bedside terminal 22 may be coupled to a different set of bedside devices 28 and 30 from those coupled to terminal 2.

The nursing station or lounge terminals 32 and 34, and system console 85, may be identical to those used in the patient care unit but without the bedside device connections, or they may comprise slightly different equipment (e.g. personal computers) so long as they provide similar functionality.

Also coupled to the LAN 1 is a file server 62 and associated disc storage device 64. The file server 62 provides controlled access by the workstations 2, 22, 32, 34, and 85 to write information to and read information from disc storage device 64.

Optionally coupled to LAN 1 may be interfaces (not shown) to couple various system peripheral equipment to the LAN 1. For example, remote access modems may be coupled to one of such interfaces to provide access to the system from remote terminals (not shown) located elsewhere in the hospital or located offsite, such as at a physician's residence. Remote access may also be employed to diagnose system problems from an off-site facility. A laboratory system may be connected to interface to permit the communication of laboratory information between the laboratory system and the clinical management system. An order communication system may be coupled to an interface to permit orders to be communicated from the system to other hospital systems (e.g. pharmacy or laboratory) and vice versa. An archival storage device may be coupled to an interface to permit any information stored in the system to be safe-stored on suitable archival media, such as magnetic tapes or optical discs.

Printers 81 and 83 are coupled to file server 62 to allow patient information to be printed for the convenience of hospital personnel and to maintain a suitable legal record of all observations, orders, parameter readings, care plans, and other patient information regarding the monitored patients. Printers 81 and 83 may be any suitable printers such as, for example, laser printers or high speed dot matrix printers. A printer may optionally be coupled to the bedside terminal and/or the terminal at the nursing station or lounge, if desired.

In operation, the system user, typically a nurse or physician, conducts a dialog with the system through the use of the keyboard, mouse, or other appropriate means for entering information such as a light-pen, touch-pad, trackball, etc.

"Icons", screen-sensitive areas, or the equivalent, or any combination thereof which is appropriate to the end application, may also be provided. "Icons" are symbols displayed on the screen whose functions are defined for the user by the system in view of the current screen context, and which can thus be readily changed according to the immediate requirements of the user application. In the present invention icons are selected by the system user by moving a screen cursor with the mouse and "clicking" on the icon, i.e., depressing the mouse button while the cursor overlies the icon.

The user provides information or queries to the system by means of the keyboard and/or pointing device(s), and he receives information from the system by means of information displayed on the screen and/or through audible signals which could include, in an alternative embodiment, speech synthesis.

Patient Flowsheet

FIG. 3 shows a Flowsheet information screen in the automated clinical records system of the present invention.

The Flowsheet screen shown in FIG. 3 shows Vital Signs information for patient Donald M. Jackson which has been recorded at approximately hourly intervals. For example, Temperature (row 167), Heart Rate (row 168), and Systolic Arterial Pressure and Diastolic Arterial Pressure (row 169) have been measured and recorded.

Forms Manager

Figure 4:
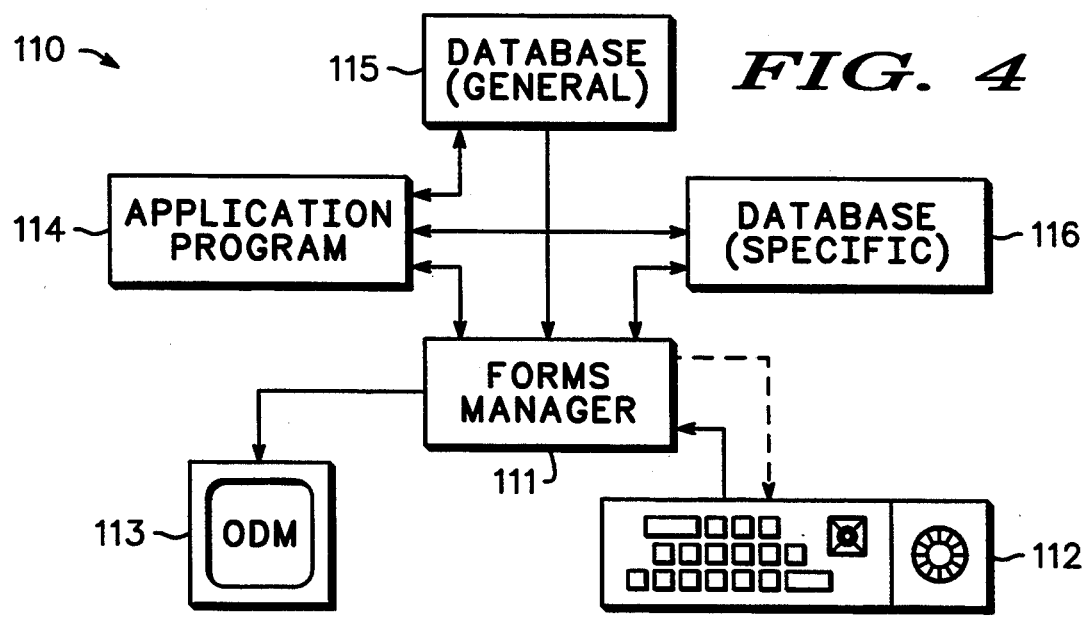
FIG. 4 Shows a block diagram illustrating the relationship of the forms manager to the application program and database.

FIG. 4 shows a block diagram illustrating the relationship of the forms manager to the application program and database. A forms manager 111 is used as an interface, or buffer, among and between the input, output, and system applications and databases.

An input device 112 is coupled to forms manager 111. Input device 112 is illustrated as a keyboard with a joy stick but may be any type of input device. In general, the communication is from input device 112 to forms manager 111. However, there may be a need for forms manager 111 to operate visual or acoustic devices on input device 112. For this reason, there may be some communication from forms manager 111 to input device 112.

Also coupled to forms manager 111 is an operator display module 113. Display 113 is typically a cathode ray tube, but may be any of numerous types of displays such as the various types of flat panel displays. Communication is generally from forms manager 111 to display 113. However, a touch sensitive screen or other type of input device may be incorporated in the system requiring communication from display 113 to forms manager 111.

Forms manager 111 also interacts with the application programs 114 and the databases. The databases, for this particular example, are broken into a general database 115 and a specific database 116. It should be understood that while the database may be functionally separated, both may be contained in the same physical location.

In this type of electronic database, a cell in a flowsheet may have a form or report associated with it which expands on the information in the cell. This form may be comprised of various attributes and processing rules obtained from one or more object instances of one or more object classes.

An object instance is the instantiation of an object class. An object class is similar to a type (as used in programming languages) in that it defines a structure. The information for these flowsheet cells and the underlying forms comes from a database containing various patient records. Examples of forms and records are found in copending patent applications "A Method of Forming a Spreadsheet Display" and "Spreadsheet Cell having Multiple Data Fields".

In operation, objects are entered through input device 112 to the forms manager. This input is checked and stored in database 116 for the particular patient. When a form is to be displayed, forms manager 111 obtains a list of objects to be displayed. One source of objects is application program 114. The forms manager then retrieves the display tiles associated with the objects from database 115. The data to be placed in the tiles is then obtained from database 116. Using these inputs, forms manager 111 develops a form which is displayed on display 113.

Application Software Architecture

Figure 5:
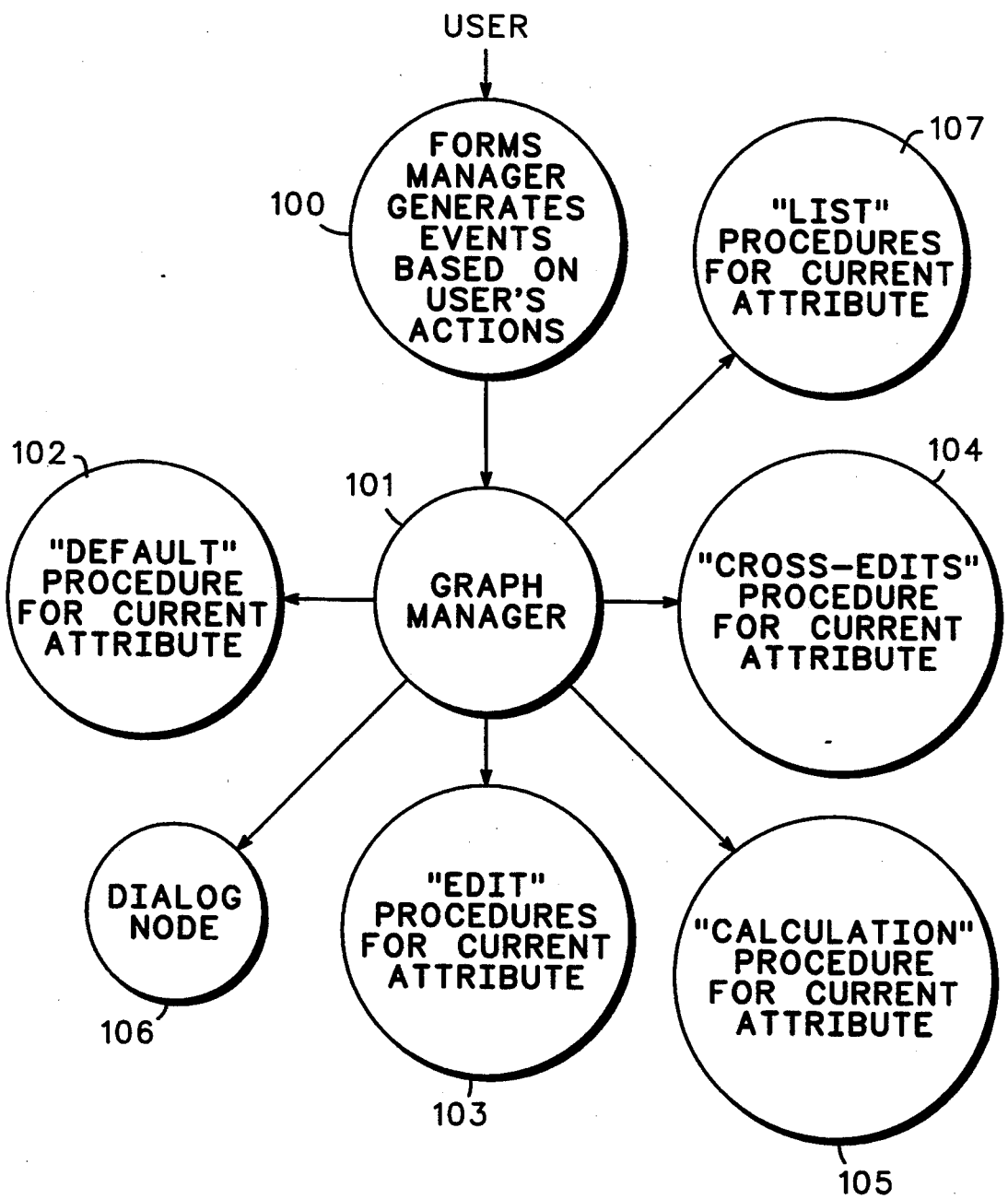
FIG. 5 shows a block diagram of the application software architecture of the present invention.

FIG. 5 shows a block diagram of the application software architecture of the present invention.

The application software architecture is a way to specify action-oriented applications. The forms manager 100 translates user actions into "events" and sends the events to the graph manager 101.

The graph manager 101 screens incoming events, takes care of calling DECL's at appropriate times, handles dialog node sequencing, and import/export data flow.

The user performs actions. The forms manager 100 generates events based on the user's actions. The graph manager 101 catches the events generated by the forms manager 101.

An application written within the application software architecture consists of a set of dialog nodes collected into graphs (and possibly sub-graphs) and graph table entries that describe the graph. Dialog nodes in the application use various attributes. Each attribute has associated with it a group of procedures, any of which is optional. These procedures are defaults, edits, calculations, and lists, collectively known as DECL's.

DEFAULT procedures are indicated generally by bubble 102; EDIT procedures by bubble 103; CALCULATION procedures by bubble 105; CROSS-EDIT procedures by bubble 104; and LIST procedures by bubble 107.

Function Graphs

The coordinating logic of an application is expressed as a set of function graphs. A function graph is a set of nodes and arcs connected into a directed graph. A function graph allows an application to be divided into a number of independent but cooperating modules. Each node on the graph has a well-defined function that it performs when invoked. (A node in a graph may represent a sub-graph.) The application designer specifies applications in terms of these graphs, drawing from a library of existing nodes and possibly adding new nodes to the library.

Function graphs are defined by a set of triplets of the form: {source_node, arc, destination_node}. Each function graph has at least one triplet of the form {GRPH_INIT, arc, destination_node}. GRPH_INIT is a "pseudo-node" that defines the entry points to the graph. Each of the arcs that come out of GRPH_INIT should match one of the arcs coming into the function graph from its parent graph.

Figure 6A:
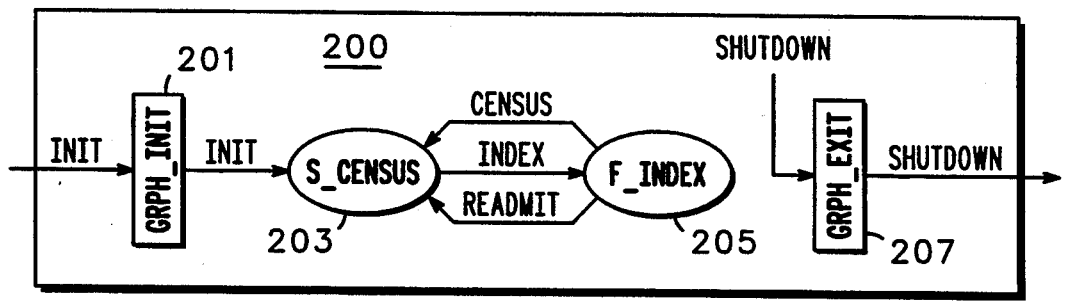
FIGS. 6A and 6B illustrate two function graphs.
Figure 6B:
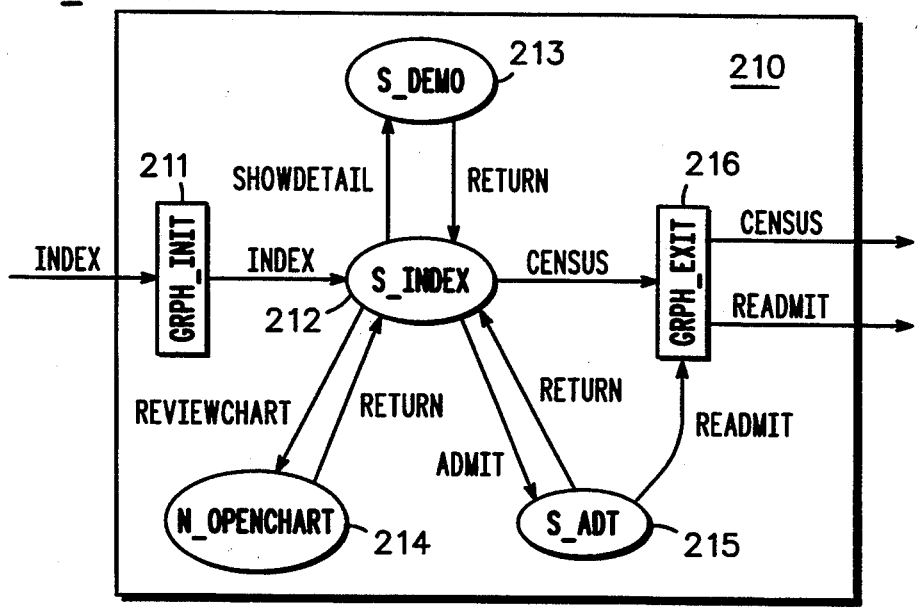

FIGS. 6A and 6B illustrate two function graphs. FIG. 6A illustrates a graph entitled "f_adt", and FIG. 6B illustrates a graph entitled "f_index", corresponding to the procedural node 205 of the same name within graph 200 of FIG. 6A.

In graph 200, node f_index is "called" via arc INDEX. In graph 210, an arc called INDEX links GRPH_INIT 211 with the first node 212 of the graph.

To exit a graph, at least one triplet of the form {source_node, arc, GRPH_EXIT} should exist. GRPH_EXIT is a "pseudo-node" that defines the exit points of the graph. Each of the arcs coming into GRPH_EXIT should match one of the arcs leaving the function graph in its parent graph.

Graph_mgt is responsible for managing the execution of these function graphs. Each node returns a status value when it completes. Graph_mgt uses the status value to determine which arc of the parent graph to follow, and therefore which node to invoke next. In addition, an invoked node is passed the name of the arc which invoked it, giving the node additional information to perform its processing. A node on a function graph may be one of several node types, or it may be another function graph. This allows function graphs to be nested as required by the application.

Dialog Nodes

Each node in a function graph is structured as an event processor. Events are generated as a result of an action, such as clicking a mouse button or changing the value of a field. The body of the node is an event loop, processing each incoming event in sequence, until the node exits. Each node has a set of events that it understands, with code segments that define processing for each event.

Figure 7:
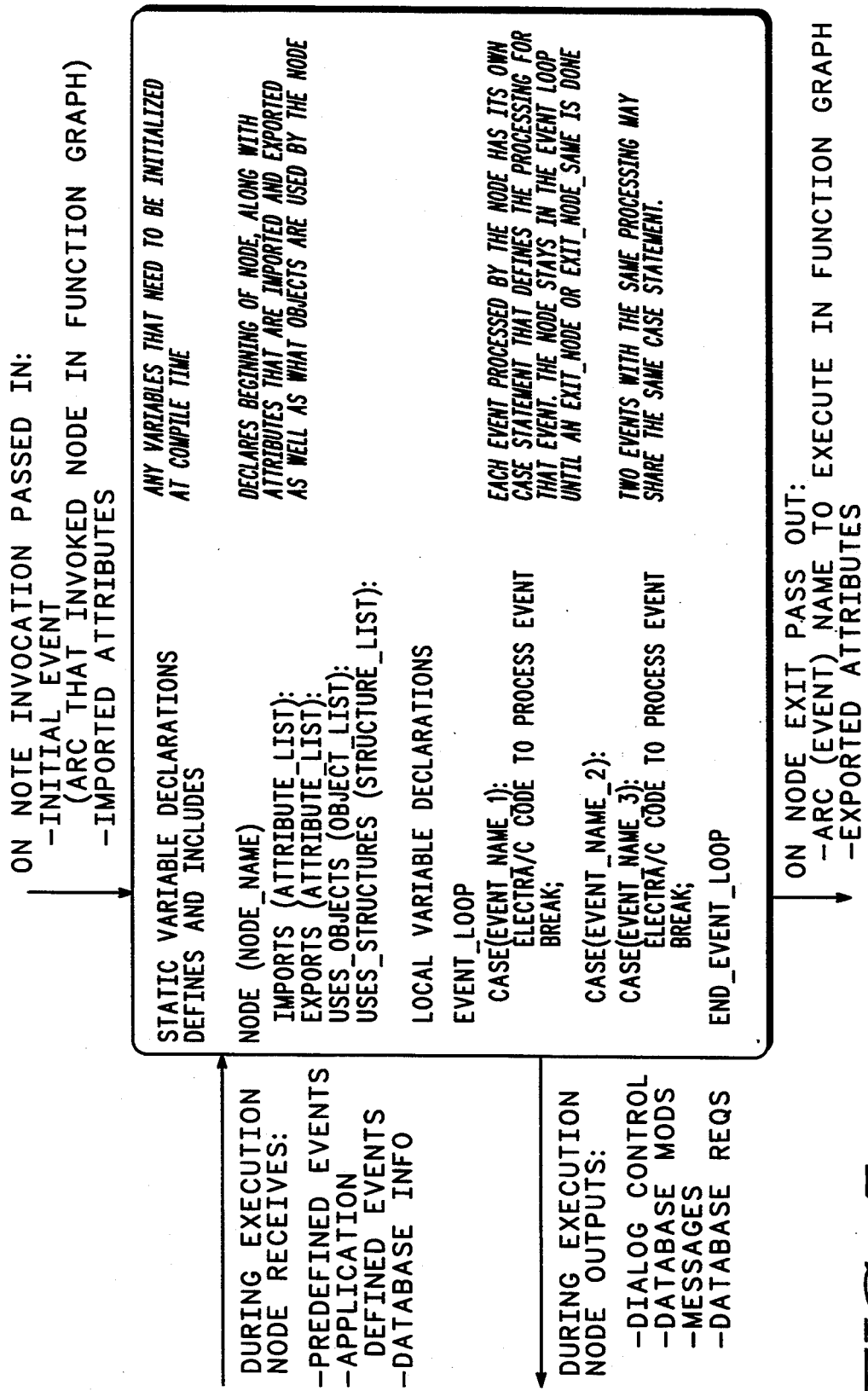
FIG. 7 illustrates the structure of an dialog node

FIG. 7 illustrates the structure of a dialog node. Each node is structured as an event processor. The body of the node is an event loop, processing each incoming event in sequence, until the node is exited. Each node has a set of events that it understands, with a code segment that defines the processing for that event. The event processing falls into one or more of the following categories:

Display and removal of forms
Display of a form menu
Enabling/disabling of user entry into form data fields
Acceptance/rejection user selection of a form object
Creation/Modification/Deletion of object instances in the database (within the context of an object action).
Dispatching of transactions to the database, rollback of previously entered object actions.
Generation of messages to other processes (e.g. opening a patient chart, requesting the printing of a report, etc).

In order to perform this processing, the event-handling code typically needs to query the database, either for the currently selected object instance, or for other data in the database.

Events

Events come from two sources: incoming graph arcs to the node (the first event a node receives is the graph arc that caused the node to be invoked), and events generated by user dialog (i.e. events triggered by user actions). These events are divided into two classes: predefined events and application defined events. Predefined events are generated by system and/or user actions under well defined conditions. Every node must define processing for these events. Applications may also define events that are associated with form menu choices. An application-defined event is generated whenever its associated menu choice is selected by the user.

Graph Table

Function graphs are defined by entries in a table in the database (the "graph table"). The entries define the sequencing between graph nodes and between graphs. Each entry in the graph table contains a source node name, an arc name (event), a destination node name, and the name of the graph containing the source node. Thus, given a graph name, a source node, and an event, the graph manager can look up the name of the node to invoke next (the destination node).

There are three special node names that are reserved by the graph manager. Entries in the graph table with "graph_init" for the source node name are entry points into a graph. Entries with "graph_exit" for the destination node name are exit points from a graph.

The Graph Table appended hereto shows the entries for the two function graphs entitled "f_adt" and "f_index" shown in 5FIGS. 6A and 6B, respectively. For example, in graph "f_adt" an INIT event links source node GRAPH_INIT 201 and destination node S_CENSUS 203.

Event Handling Within the Graph Manager

Out of all the events (predefined and application defined), the graph manager catches/screens only six: DEFAULT, NEW, SIGN, OK, MORE, and CROSS_EDIT.

DEFAULT and CROSS_EDIT events are never passed on to the application dialog nodes; the others might be passed on after certain processing is completed.

These events and the resulting processing are described in the pseudo-code appearing in Appendix B.

DETAILED DESCRIPTION

DECL's in General

In the context of the present invention, an "attribute" is the smallest piece of useful data in a data object (i.e. data field in the database).

There are certain processing tasks associated with each attribute that don't change. For example the rules for validating user input of a particular attribute are the same regardless of which application is allowing the user to enter the data.

Traditionally, libraries are built for such functions, and all applications must call the appropriate functions for the attributes they use. Each function is written to process one particular attribute. When a library function is changed, deleted, or added, all of the applications that use the function (i.e. use the attribute the function is associated with) must be (correctly) modified, recompiled, and retested.

Removing responsibility for such routine tasks (or procedures) from the applications reduces errors, maintenance time, implementation time, and design time. The following describes a method for automatically performing routine procedures so that the applications don't have to deal with them. Also described is a way to reduce the number of routine procedures required in a system.

An application uses various object attributes. Each attribute has associated with it a group of procedures, any of which is optional. These procedures may include defaults (supplies a default value for an attribute), edits (validates a new value for an attribute), calculations (calculates an attribute value from other attribute values), and lists (builds a sublist from a list). Defaults, edits, calculations, and lists are collectively known as DECL's.

In order to cut down on the number of different DECL's procedures in a system (in particular, edits), a DECL may be associated with more than one attribute. For example an edit procedure might exist that verifies that a date is not later than the current date. It would be better to associate the one edit with many attributes (e.g., admission date, birth date) than to write many edits that do the same thing, but are slightly different in that each deals with a different attribute.

In addition, edit procedures may be associated with an attribute type, so that an edit procedure is automatically applied to all attributes of a type and all the attributes of the type's children types. For example an edit might exist that verifies that a number entered by a user contains only digits and is in a particular range (e.g., 0–32767). This edit could be associated with all attributes whose type is integer. Further, the edit might be applied to attributes of type int_id (whose parent type is integer)and staff_id (whose parent type is int_id).

A type's "children" type is one that contains the characteristics of another type, referred to as a "parent" type. For example, with reference to the Attribute Type Table appended hereto, the type "staff_id" is a "child" of the type "int_id". Through the concept of attribute type inheritance, all children must inherit the edit rules and storage format of their parent.

When an application uses an attribute, it automatically uses the DECL's associated with that attribute. Thus the application designer doesn't need to worry about the details handled by the DECL's, because the application doesn't have to deal with them. Once the DECL's are written for an attribute, any application that uses that attribute also uses those procedures (automatically).

Attributes may have any combinations of DECL's associated with them. For example, an attribute may have no DECL's, or it might have a list procedure and an edit procedure, but no transforms, defaults, or calculations.

Defaults

A default procedure determines the default value for its associated attribute, if such a value exists. An attribute may have at most one default procedure associated with it.

Figure 8:
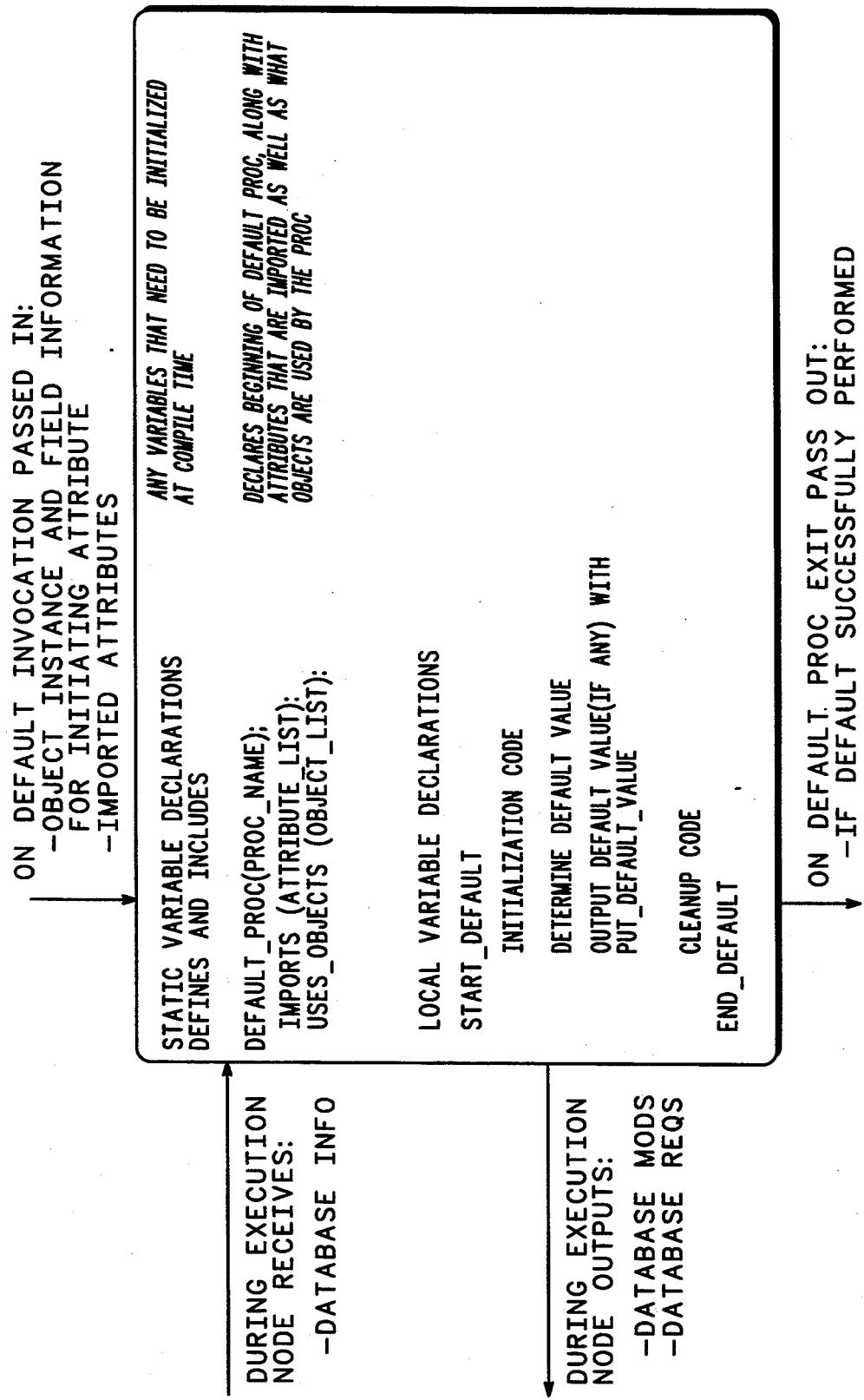
FIG. 8 illustrates the structure of a default procedure.

FIG. 8 illustrates the structure of a default procedure. Default procedures are invoked when a DEFAULT event is received for the associated field, based on a forms_mgt algorithm. A DEFAULT event occurs when the user selects a field for data entry. The default procedure determines the default value for the attribute, if one exists, and stores that value in the database.

Edits

An edit procedure defines a set of validity constraints, or edit rules, for one or more attributes. An edit rule contains an attribute specifier (since the edit procedure may be associated with more than one attribute which may be "wild-carded" to include all attributes), a Boolean expression that represents the edit rule, and an error message to display if the edit rule fails. If the edit rule fails, the edit procedure exits (no subsequent edit rules within the edit procedure are tested).

In addition to edit rules, an edit procedure may define edit rule warnings. Edit rule warnings are the same as edit rules except that if the Boolean expression evaluates to false, the user is presented with a message and allowed to decide whether to proceed or not. If the user chooses to proceed, the edit rule passes. Otherwise it fails.

As mentioned above, each attribute may have zero or more edit procedures associated with it. In addition, attribute types may have edit procedures associated with them, which are applied to any attribute of that type. An attribute type also inherits the edits of any parent attribute types as defined in the system attribute type table.

The association between edit procedures and attribute types is specified in a database look-up table for attribute types. Refer to the Attribute Type Table appended hereto.

Attributes may have two classes of edits associated with them: single-field edits and cross-field edits. A single field edit is initiated whenever new data is entered for an attribute. The edit checks that the new value is valid based on either constant information (e.g., month must be between one and twelve, inclusive) or against "system data" (e.g., current date).

Cross-field edits are initiated for all fields that have received new data when the user tries to leave the form. They are also initiated for any fields designated "required" if the field has been enabled for entry (regardless of whether any data has been entered in the field). Cross-field edits are used to check consistency between the field they are associated with and other data in the database (e.g., that the dose, concentration, and amount of an IV drip are consistent). They are also used to implement required fields.

An attribute may have zero or more of each class of edit procedures.

Figure 9:
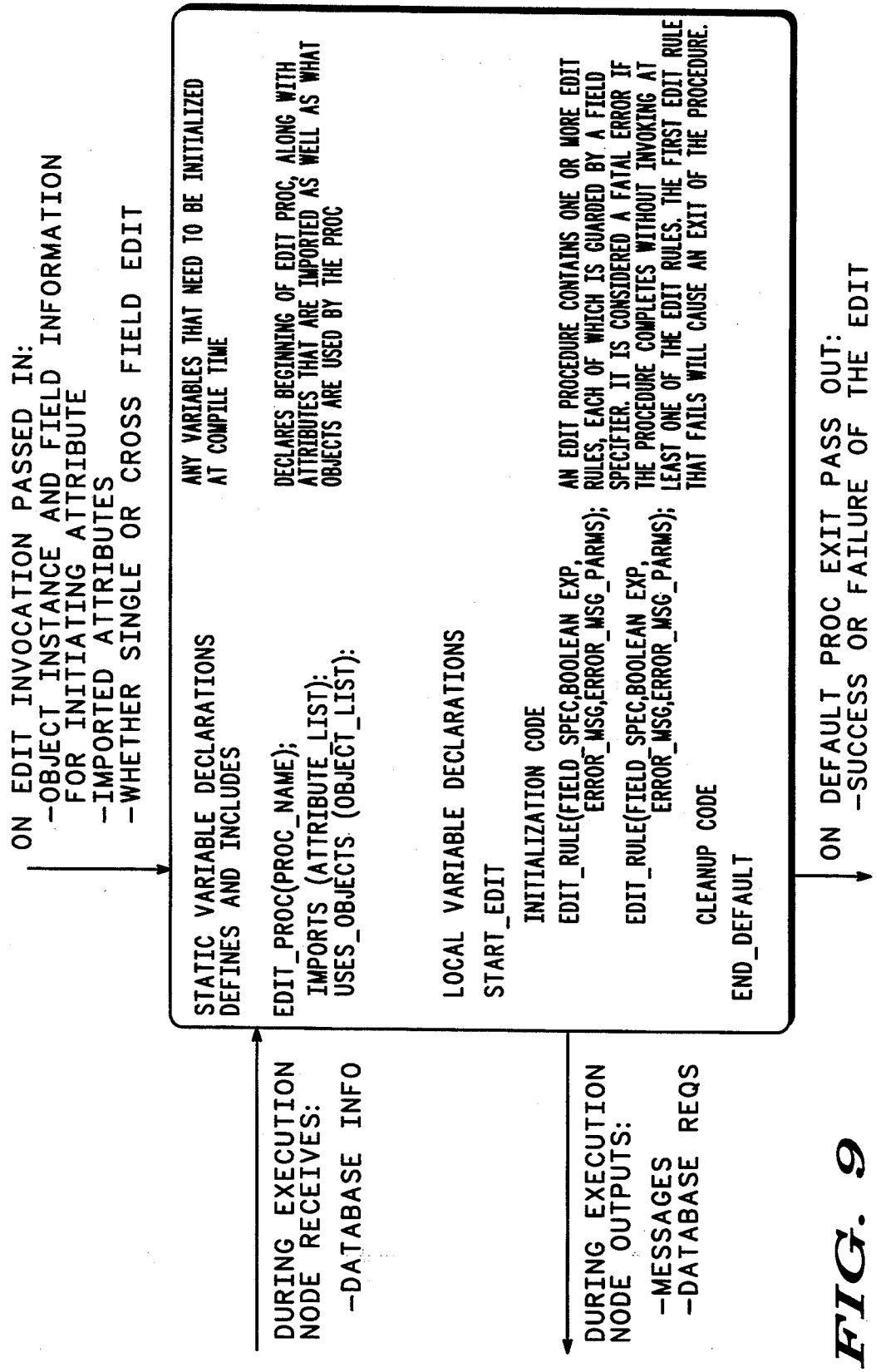
FIG. 9 illustrates the structure of an edit procedure.

FIG. 9 illustrates the structure of an edit procedure.

Calculations

A calculation procedure defines a way of deriving the value of an attribute based on other information in the database. A calculation procedure is initiated when a new value is entered into the system database for one of the "triggers" associated with the calculation procedure. A "trigger" is an independent variable in the equation that calculates the target attribute. When the value of a trigger is updated, a calculation procedure for an associated attribute is called and performed.

A "calculation procedure" defines a way of deriving the value of an attribute based upon other information in the database. A calculation procedure may take the form of an equation.

A trigger value may change in the system database, by action of a system user, for example, or by other appropriate input means such as the output of a transducer like a blood-pressure reader or urine collector.

The calculation procedure determines if it was invoked with a valid trigger, obtains the trigger data, does the calculation, and outputs the result. Outputting a result may trigger other dependent calculations.

Figure 10:
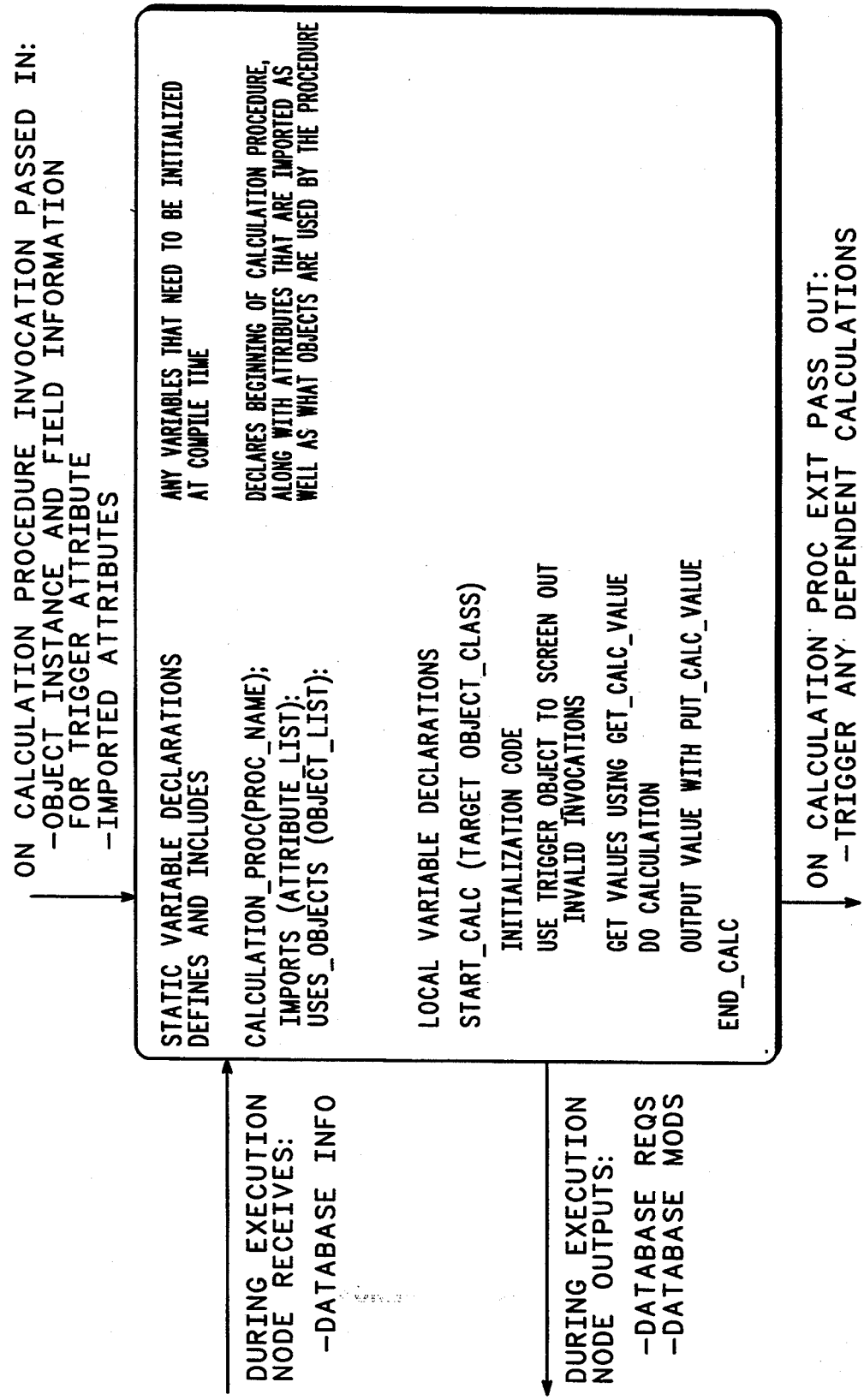
FIG. 10 illustrates the structure of a calculation procedure.

FIG. 10 illustrates the structure of a calculation procedure.

Lists

A list procedure is used to implement a list whose list items vary during run-time. The list procedure selects items from a master list based on criteria specified in the body of the list procedure and passes those items to the forms manager for display.

The association between DECL's and attributes is specified in a database look-up table for attributes. Refer to the Attribute Table appended hereto.

Figure 11:
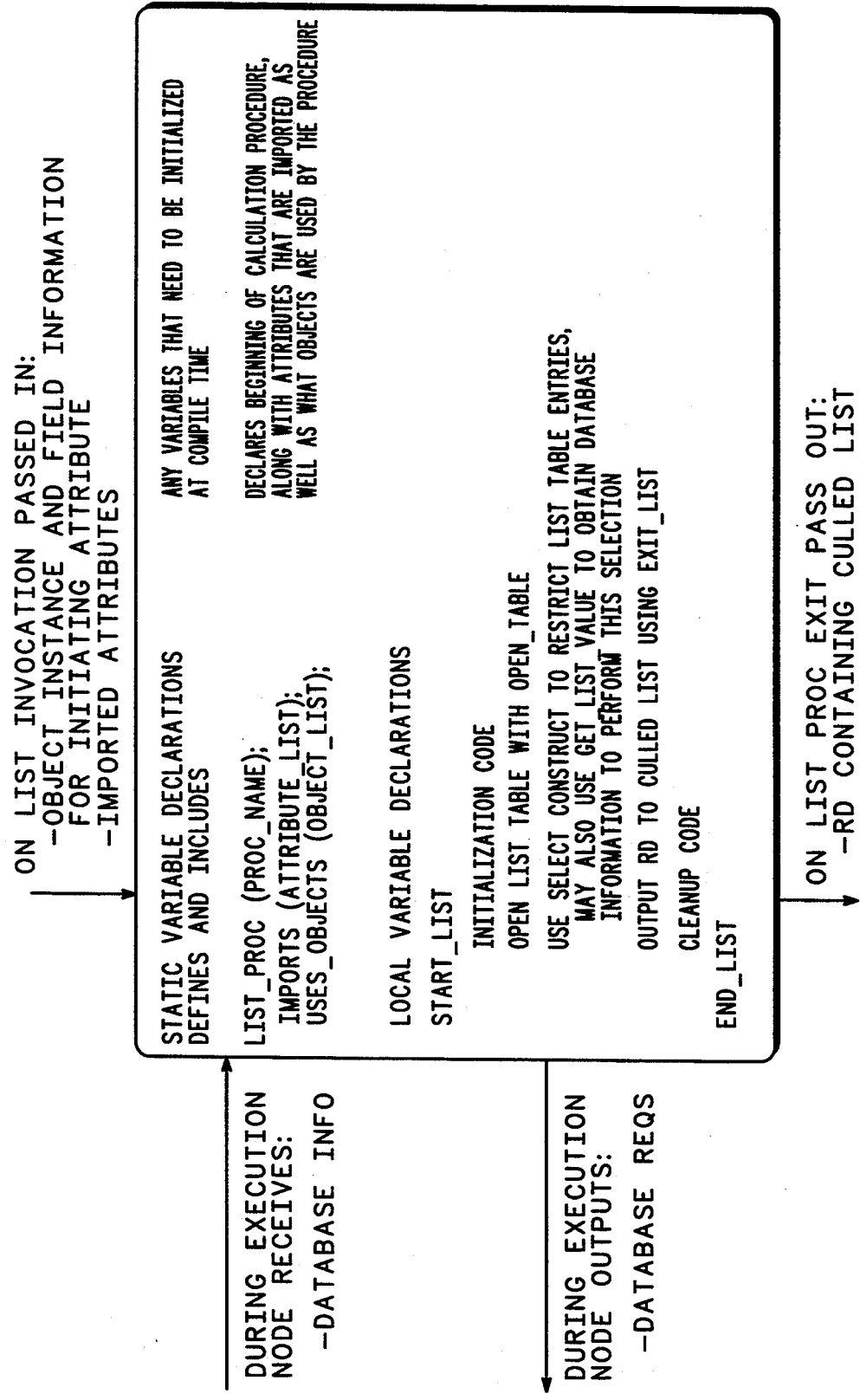
FIG. 11 illustrates the structure of a list procedure.

FIG. 11 illustrates the structure of a list procedure.

Attribute Order

Since so many DECL's may be associated with an attribute, the order in which they are applied to the attribute is important. For example edits are applied in the following order: All edits for the most primitive attribute type in the inheritance tree for the attribute's type, then the edits for the next child type, and so forth. Then all the edits for the attribute itself are applied. Within any given level, edits are applied in order of definition in the table (i.e. left to right).

Because cross-field edits can only be associated with attributes (not attribute types), only the cross-field edits for the specific attribute are invoked (in table definition order). An attribute must pass all of the edits associated with it in order to be considered valid.

Using the example tables in the appended Attribute Table: to be considered valid, the "who" attribute would have to pass (in order) edits e_valid_int, e_valid_intid, e_valid_staffid, e_nurseid, and e_active_id. The edit rule e_valid_int checks for a valid integer; e_valid_intid checks for a valid internal i.d.; e_valid_staffid checks for a valid staff i.d.; e_nurseid checks for a valid nurse i.d.; and e_active_id checks for a valid current i.d.

When specifying an application, the application designer must specify what attributes the application will use. When an application uses an attribute, it automatically uses the DECL's associated with that attribute. Thus the application designer doesn't need to worry about the details handled by the DECL's, because the application doesn't have to deal with them. Once the DECL's are written for an attribute, any application that uses that attribute also uses those procedures (automatically).

It should again be emphasized that DECL's may be easily changed, in order to customize the system for a different user environment, simply by changing the appropriate attribute tables.

Attributes may have any combination of DECL's associated with them. For example, an attribute may have no DECL's, or it might have a list procedure and three edit procedures, but no defaults or calculations.

Applications are event-driven and are thus controlled by the process (or processes, as there may be more than one) they receive events from. Based on the events and the attribute(s) that are associated with them, the controlling process invokes the appropriate procedures associated with the attributes. Then, depending on the event and the results of the procedures, the controlling process optionally passes the event(s) to the application.

The controlling process determines which procedure(s) to invoke for a particular event and attribute by looking up the procedure in a table, such as Table 1. Thus to add, change, or delete a procedure merely requires changing appropriate table entries. The application code doesn't have to be changed.

DECL's and Application Software Architecture

There are two controlling processes, the forms manager and the graph manager. The forms manager handles all user I/O, as well as the details of exactly what appears on the screen, including such things as pop-up windows with lists of choices for the user. The forms manager also translates user actions into events and sends those events to the graph manager.

The graph manager receives from the forms manager events and which attributes those events are associated with (one attribute per event). The graph manager screens incoming events, passing some to the applications and acting on others. Based on events received, the graph manager calls appropriate procedures to handle default values, validation of new values (edits), and calculation of values.

Both the forms manager and the graph manager determine which DECL's procedures to invoke by using a look-up table in a database.

The application sits underneath all of this waiting for events from the graph manager and dealing with them when received.

DECL's and the Graph Manager

When the graph manager receives a default event, it looks up in the attribute table the attribute for which the event was generated. If the attribute has a default procedure associated with it, the graph manager calls it.

The default procedure determines the default value for the attribute (possibly based on database attribute values, other screen values, etc), gives it to the forms manager to display on the screen, and returns.

The graph manager then looks up the calculation procedures that are triggered by the attribute (i.e. all calculations that depend on the attribute—for example 'B' is a trigger in the calculation "A=B+C") and calls the procedures, and any calculations that are triggered as a result. The graph manager doesn't pass default events to the application.

When the graph manager receives a new event, it looks up in the attribute table the attribute for which the event was generated. If the attribute has any edit procedures (there may be zero or more) associated with it, the graph manager calls the edit procedures one at a time.

If any one edit procedure fails, the graph manager empties the event queue (where all incoming events are kept until the graph manager can process them). The edit procedure that failed notified the forms manager of the error and supplied the forms manager with an error message to display.

If all of the edit procedures for the attribute succeed, then the user has entered a valid value. The graph manager looks up the calculation procedures that are triggered by the attribute and calls the procedures, and any calculations that are triggered as a result.

After calling the calculation procedures (if any) for an attribute, the graph manager passes the new event to the application. If an edit fails, the new event is not passed to the application.

The graph manager passes all other events it receives directly to the application.

Lists and the Forms Manager

When the user selects a field on the screen that is enterable (i.e. the user is allowed to enter data), the graph manager looks up the field's associated attribute in an attribute table to determine if there is a list procedure associated with the attribute. If there is, the forms manager calls the list procedure, which returns a list of objects. The forms manager then displays the list in a pop-up window so that the user can select an item from it for the selected field.

The forms manager generates other special events, such as cross-edit events for cross-field edit procedures (which appear in the attribute table in the database under a column for cross-edit procedures).

DECL's DETAILED IMPLEMENTATION

Graph Management

Figure 12:
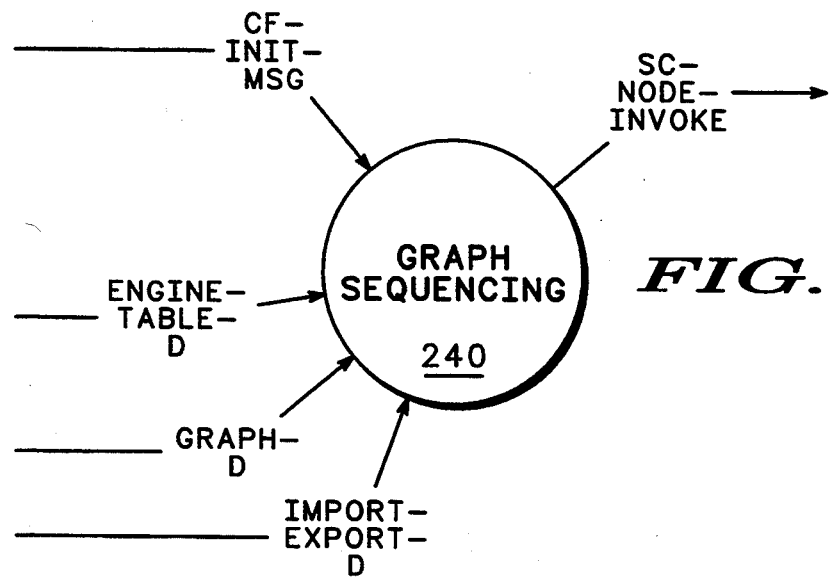
FIG. 12 shows the "Graph Sequencing" function of graph management.

FIG. 12 shows the "Graph Sequencing" function of graph management. "Graph Sequencing" 230 is responsible for managing the function graph aspect of graph management and is initially started via a CF-init-msg. This message includes the user function type that the graph_mgt is executing on (e.g. CENSUS, CHART) as well as information that is imported to the master function graph (e.g. PATIENT-ID, WORKSTATION-NAME, etc.). "Graph Sequencing" determines what the master graph is for this user function type by looking in the ENGINE-TABLE-D and begins executing it.

g raph-d controls the sequencing of the graphs. A node is invoked and based on IMPORT-EXPORT-D, any import variables are passed to it (via SC-node-invoke). When the node completes execution, the return status and graph-d are used to determine the next node to invoke. When a GRPH-EXIT is encountered in the master graph, graph sequencing sits quietly and waits for the next CF-init-msg.

Figure 13:
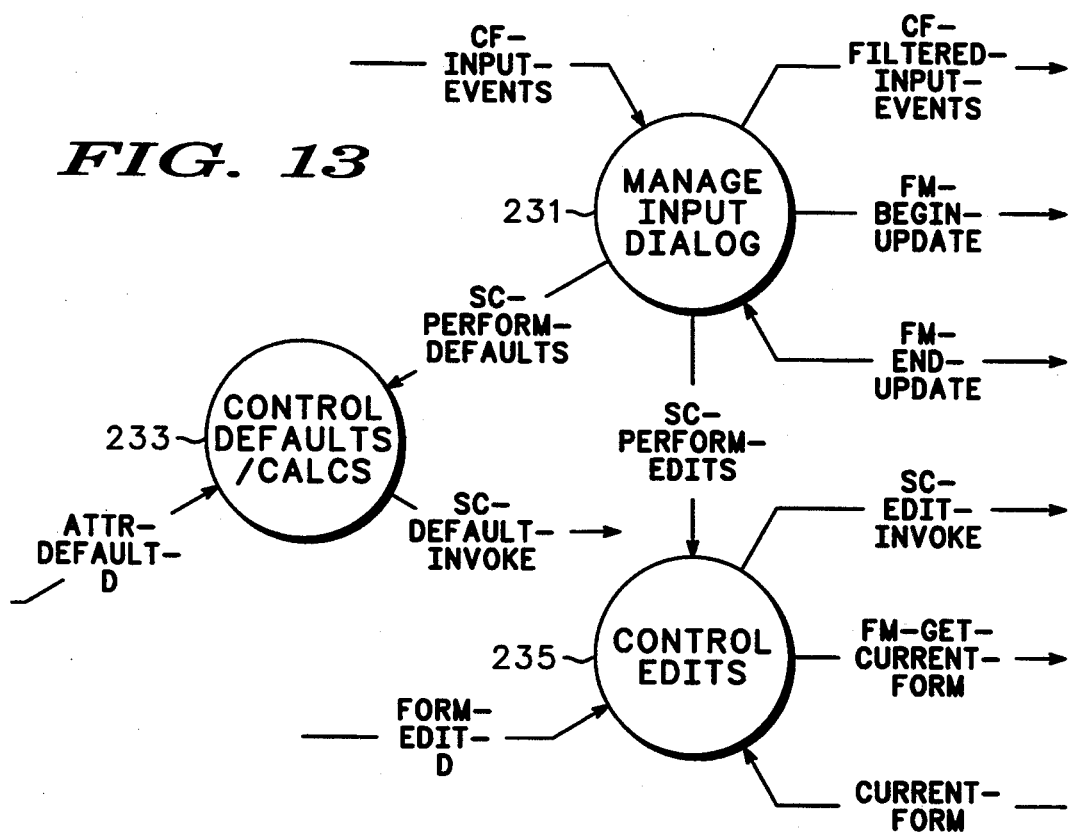
FIG. 13 shows the "Manage Input Dialog" function of graph management.

FIG. 13 shows the "Manage Input Dialog" function of graph management. "Manage Input Dialog" 231 is responsible for controlling the response to user input events (received via CF-input-events). Most events are passed through to the application (via CF-filtered-input-events).

DEFAULT and NEW trigger default or calculation functions and single field edit processing (via SC-perform-defaults and SC-perform-edits). DEFAULTs are never passed through to the application. NEWS are passed to the application for an entered field after any default/edit processing and if it passes any edit processing.

SIGN, OK and MORE trigger performance of cross-field edit checks and are only passed through to the application if all edits succeed.

Figure 15:
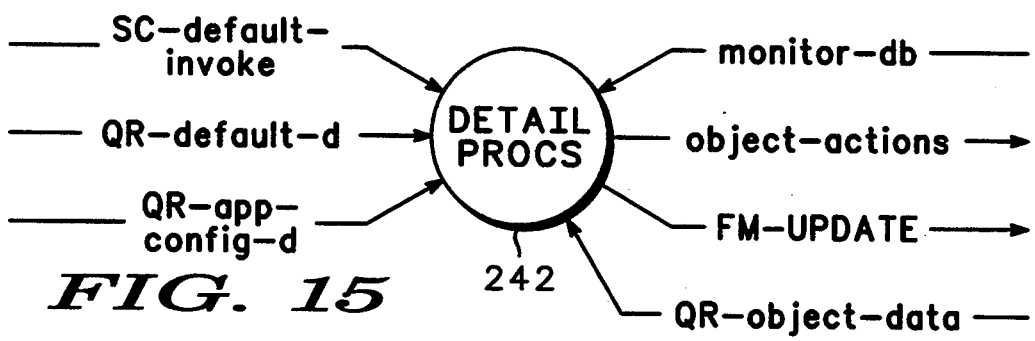
FIG. 15 shows a "Default Procedures" node.

When a DEFAULT or NEW event is received, "Manage Input Dialog" does an FM-BEGIN-UPDATE to hold any form updates (as a result of FM-UPDATES done by "Default-Procs". see FIG. 15). "Manage Input Dialog" issues an FM-END-UPDATE to allows those form updates to proceed after all the default/calculation processing has completed.

When commanded to perform a default/calculation on a specified attribute, "Control Default/Gales" 233 invokes the appropriate "Default Proc" (known via ATTRIBUTE-DEFAULT-D) via SC-default-invoke. This causes any fields dependent on the newly defaulted/calculated field to be defaulted/calculated via SC-default-invokes (based on information in ATTRIBUTE-DEFAULT-D).

"Control Edits" 235, when commanded to perform single field edits on a specified attribute (by SC-perform-edits), causes all the associated edits (known from FORM-EDIT-D) on that attribute to be done via SC-edit-invoke. A failure of any will abort further edit processing for that attribute. If commanded to perform cross-field edits, all the edits for the currently active form (fetched via FM-GET-CURRENT-FORM and CURRENT-FORM) are performed (known via FORM-EDIT-D). FORM-EDIT-D contains two sets of information: a) all single field edits for the attributes on a form, and b) all cross-field edits on a form.

Single field edits for an attribute are invoked in the following order: All edits for the most primitive attribute type in the inheritance tree for the attribute's type, then the edits for the next child attribute type, and so forth. Then all edits for the attribute itself. Within a given level, edits are invoked in order of definition (i.e. left to right).

Figure 14:
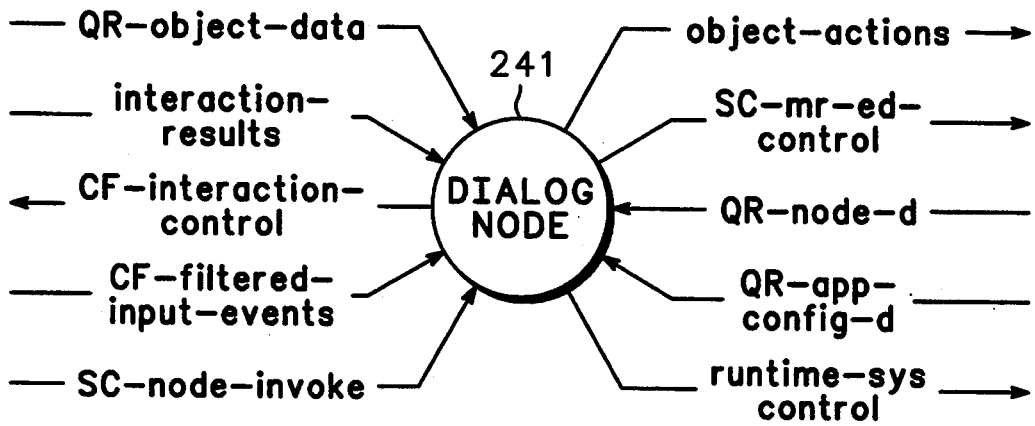
FIG. 14 shows a "Dialog Node".

FIG. 14 shows a "Dialog Node" 241. Dialog nodes interact with the Form Manager to control data display and entry. When dialog node 241 is invoked (via SC-node-invoke), it retrieves the definition of its processing (via QR-node-d), and also receives a set of import attributes and the name of the invoking arc (via SC-node-invoke). It may use a variety of tables to specify options in how it controls the dialog (via QR-app-config-d).

Dialog nodes make requests to the Form Manager to display data on various forms (via CF-interaction-control and interaction-results) and receive notification of various events (e.g. field selected) via CF-filtered-input-events. The dialog nodes specify what actions are to be carried out for each of these events (e.g. change menu definitions, proceed to a particular field), again via CF-interaction-control.

As a result of the user dialog, a dialog node may request object instance data (via QR-object-data), modify that object instance data (via object-actions) and cause those object actions to be sent to the database (via SC-mr-ed-control). It may also generate a variety of system control commands (via runtime-sys-control).

FIG. 15 shows a "Default Procedures" node 242. Defaults are a way of loading a value into a field on a form "automatically". The algorithm for determining the default value (the default "rule") is specified in a "Default Procedure". A calculation is also implemented via a default rule.

Graphmgt invokes a default procedure via SC-default-invoke. The description of the default rules is then retrieved via QR-default-d. A set of information is passed in the invoke that enables the procedure to determine for what kind of object and field it has been invoked. The default procedure then determines the default value. It may utilize other previously stored data to do so (via QR-object-data), or it may use unvalidated monitor data (via monitor-db). Information obtained from QR-app-config-d may be used to determine any options. Once it has the default value, it is entered into the database via object-actions. The form is refreshed via FM-UPDATE.

Figure 16:
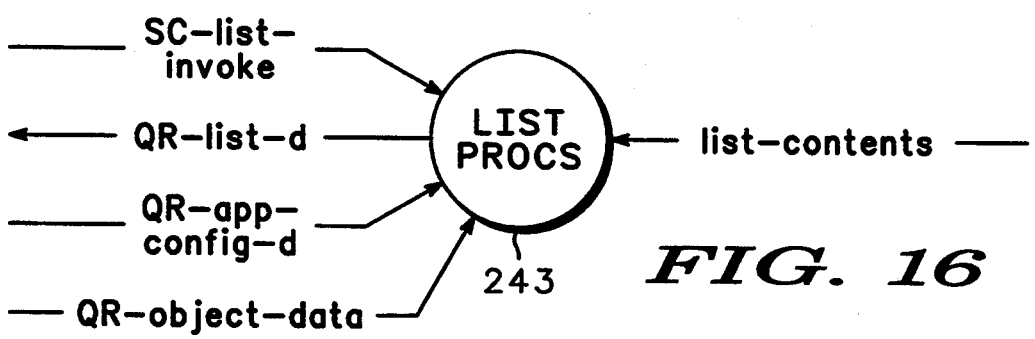
FIG. 16 shows a "List Procedures" node.

FIG. 16 shows a "List Procedures" node 243. When a field (attribute) is selected by the user on a form, if it has a list, the form_mgt will cause it to be displayed. Lists are associated with the attribute. Some attributes have fixed lists, which are handled by form_mgt. Other attributes have dynamic lists that change based on the value of other attributes previously entered. List procedures are responsible for creating those dynamic lists.

The form_mgt invokes the list procedure via SC-list-invoke. The list procedure then retrieves a description of its rules via QR-list-d. It may use information obtained via QR-app-config-d or QR-object-data to control options. It then determines what the contents of the list to display are and outputs the list via list-contents.

Figure 17:
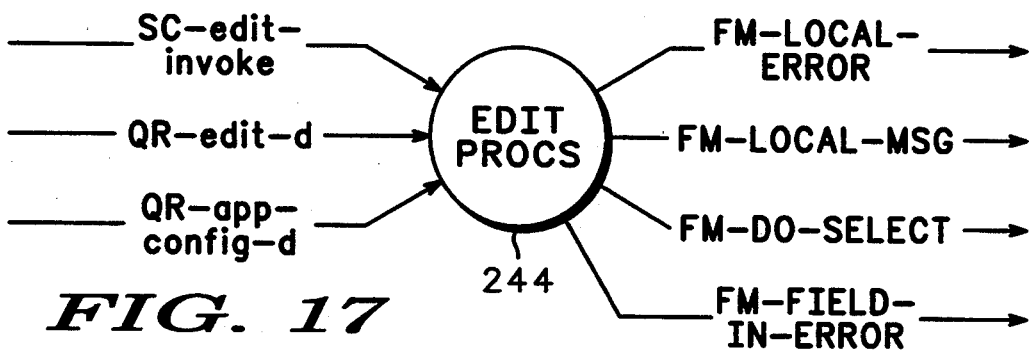
FIG. 17 shows an "Edit Procedures" node.

FIG. 17 shows a "Edit Procedures" node 244. Edit procedures are defined to establish validity constraints for attributes. The rules for determining if an attribute passes those validity constraints are embodied in an edit procedure. Each attribute may have zero to N edit procedures assigned to it. An attribute must pass ALL of the edits in order to be valid.

Graph_mgt invokes an edit procedure via SC-edit-invoke. The description of the edit rule is then retrieved via QR-edit-d. A set of information is passed in the invoke that enables the procedure to determine for what kind of object and field it has been invoked (and whether it is being invoked for a single field or a cross-field edit). The edit procedure then determines if the value of the attribute is valid. It may utilize other previously stored data to do so (via QR-object-data). Information obtained from QR-app-config-d may be used to determine any options.

If the value is valid, SC-edit-invoke is completed with an ACCEPT. If the field is invalid (and in single-field edit mode), the edit procedure forces a selection of the erroneous field via FM-DO-SELECT, flags the field in error via FM-FIELD-IN-ERROR and then SC-edit-invoke is completed with a reject.

Before returning, the edit procedure has the option of displaying information to the user. It may use FM-LOCALMS MSG to show advisory information that does not have to be acknowledged. It may use FM-LOCAL-ERROR to display information that has to be acknowledged before the user can proceed. If in cross-field edit mode, the edit procedure should only flag the field in error (via FM-FIELD-IN-ERROR) and complete SC-edit-invoke with a reject.

FIGS. 18A-18D show a flow diagram corresponding to the pseudo-code of Appendix B, illustrating how DECL's functions are associated with attributes according to a preferred embodiment of the invention.

Figure 18B:
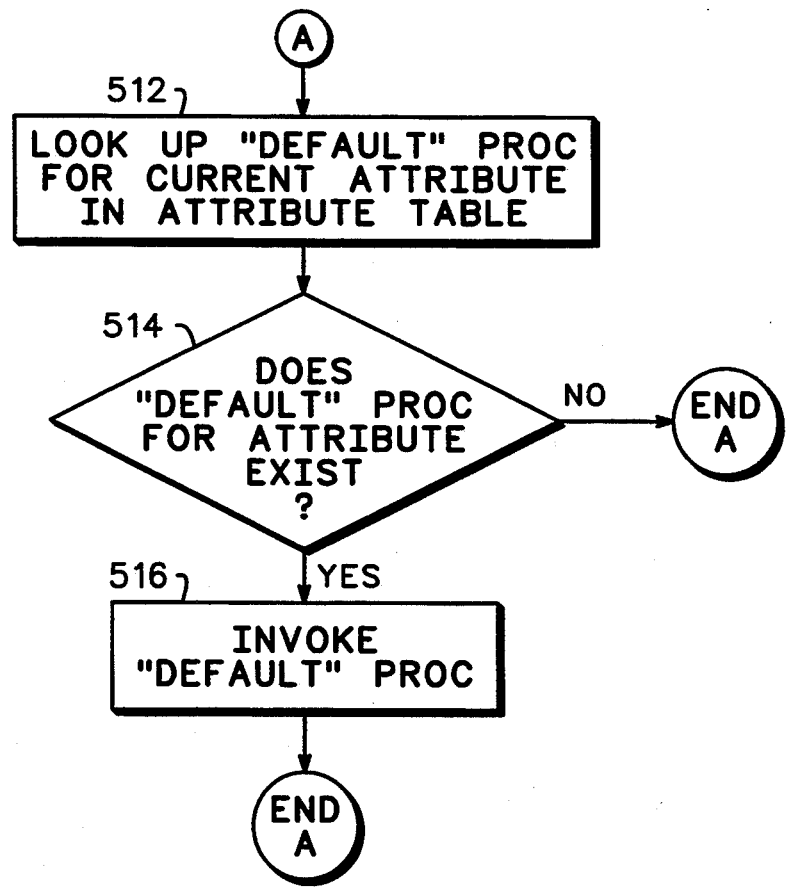
FIGS. 18A–18D show a flow diagram corresponding to the pseudo-code of Appendix B, illustrating how DECL's functions are associated with attributes according to a preferred embodiment of the invention.
Figure 18A:
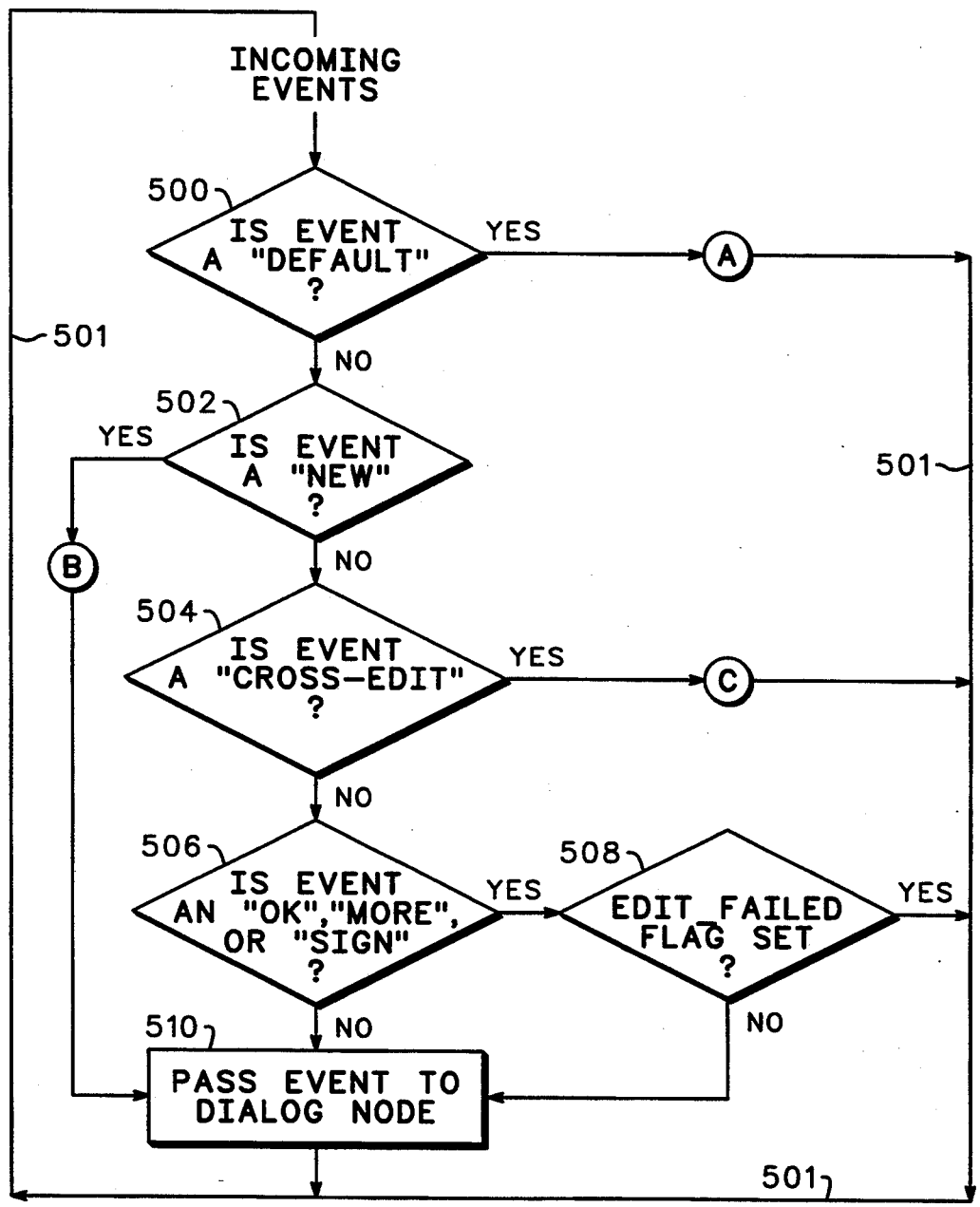

In FIG. 18A incoming events enter decision box 500; if the event is a DEFAULT, it proceeds to Routine A in FIG. 18B and ultimately returns via path 501 to handle the next incoming event; if not, it continues with decision box 502. In box 502, if the event is a NEW, it proceeds to Routine B in FIG. 18C and ultimately returns via path 503 to enter box 510; if not, it continues with decision box 504. In decision box 504, if the event is a CROSS-EDIT, it proceeds to Routine C in FIG. 18D and ultimately returns via path 501 to handle the next incoming event; if not, it continues with decision box 506.

In decision box 506, if the event is an OK, MORE, or SIGN, it proceeds to decision box 508, where if the Edit_Failed flag is set, the procedure returns via path 501 to handle the next incoming event, but if not it proceeds to box 510, where the event is passed on to the dialog node. In decision box 506, if the event is not an OK, MORE, or SIGN, it proceeds to box 510 and then the procedure returns via path 501 to handle the next incoming event.

In FIG. 18B, Routine A begins by entering box 512, where the DEFAULT procedure is looked up in the Attribute Table for the current attribute. Next the routine enters decision box 514, where if the DEFAULT procedure does not exist for the attribute, the routine exits, and if it does exist, the routine proceeds to box 516. In box 516, the DEFAULT procedure is invoked, and then Routine A exits.

Figure 18C:
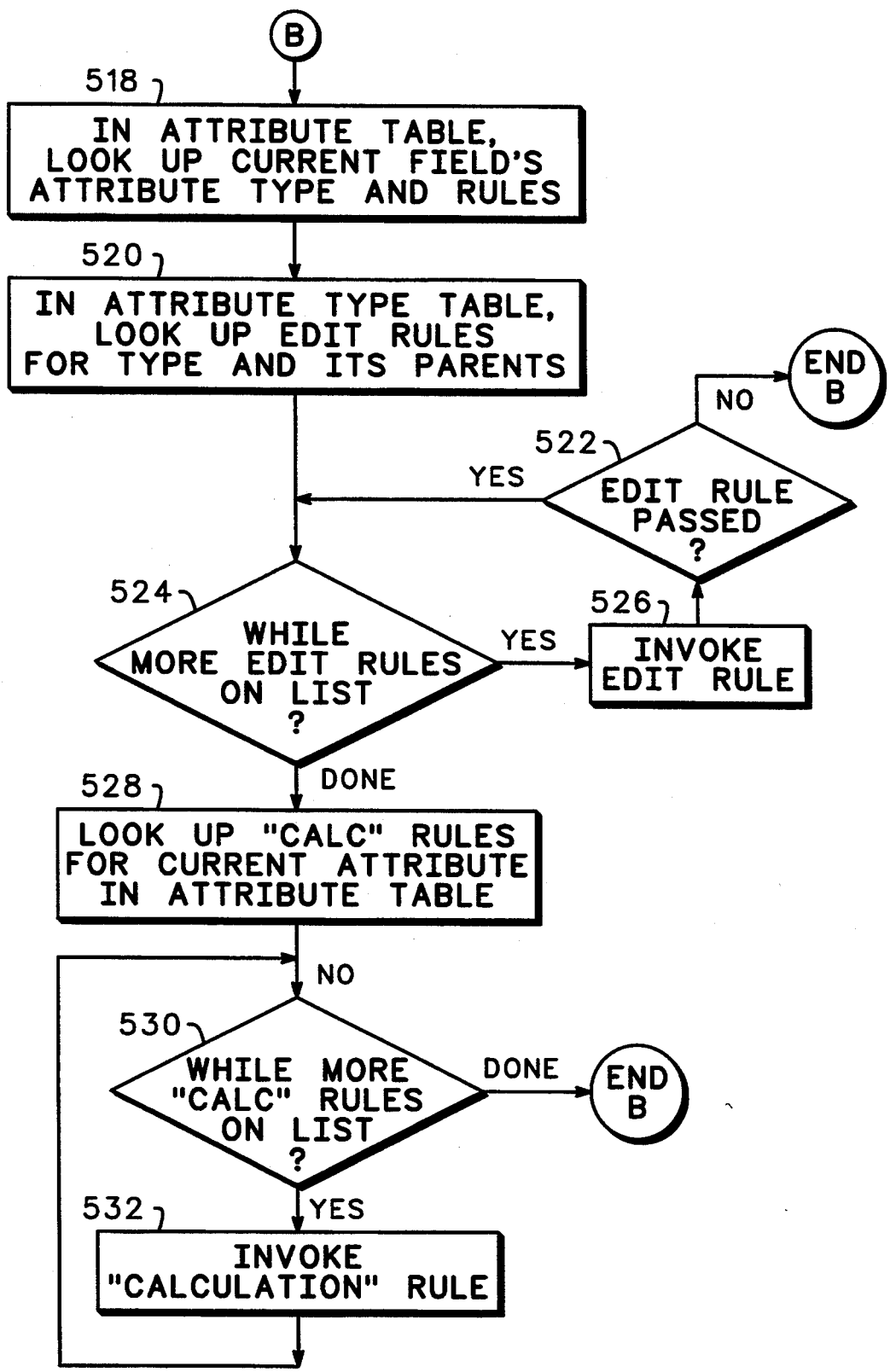

In FIG. 18C, Routine B begins by entering box 518, where the current field's attribute type and rules are looked up in the Attribute Table. Next in box 520 the EDIT rules for the attribute type and its parents are looked up in the Attribute Type Table.

Then the routine proceeds to loop box 524, where if more EDIT rules are on the table list, then it proceeds to box 526 where the EDIT rule is invoked and the routine goes to decision box 522. In decision box 522, if the EDIT rule passed, the routine returns to the loop box 524, but if not it exits.

When no more EDIT rules are on the list, the routine leaves the EDIT rules loop and goes to box 528, where the CALC rules for the current attribute are looked up in the Attribute Table.

Next the routine proceeds to loop box 530, where if more CALC rules are on the table list, it proceeds to box 532, where the CALC rule is invoked, and then returns to the loop box 530. When no more CALC rules are on the list, the routine exits.

Figure 18D:
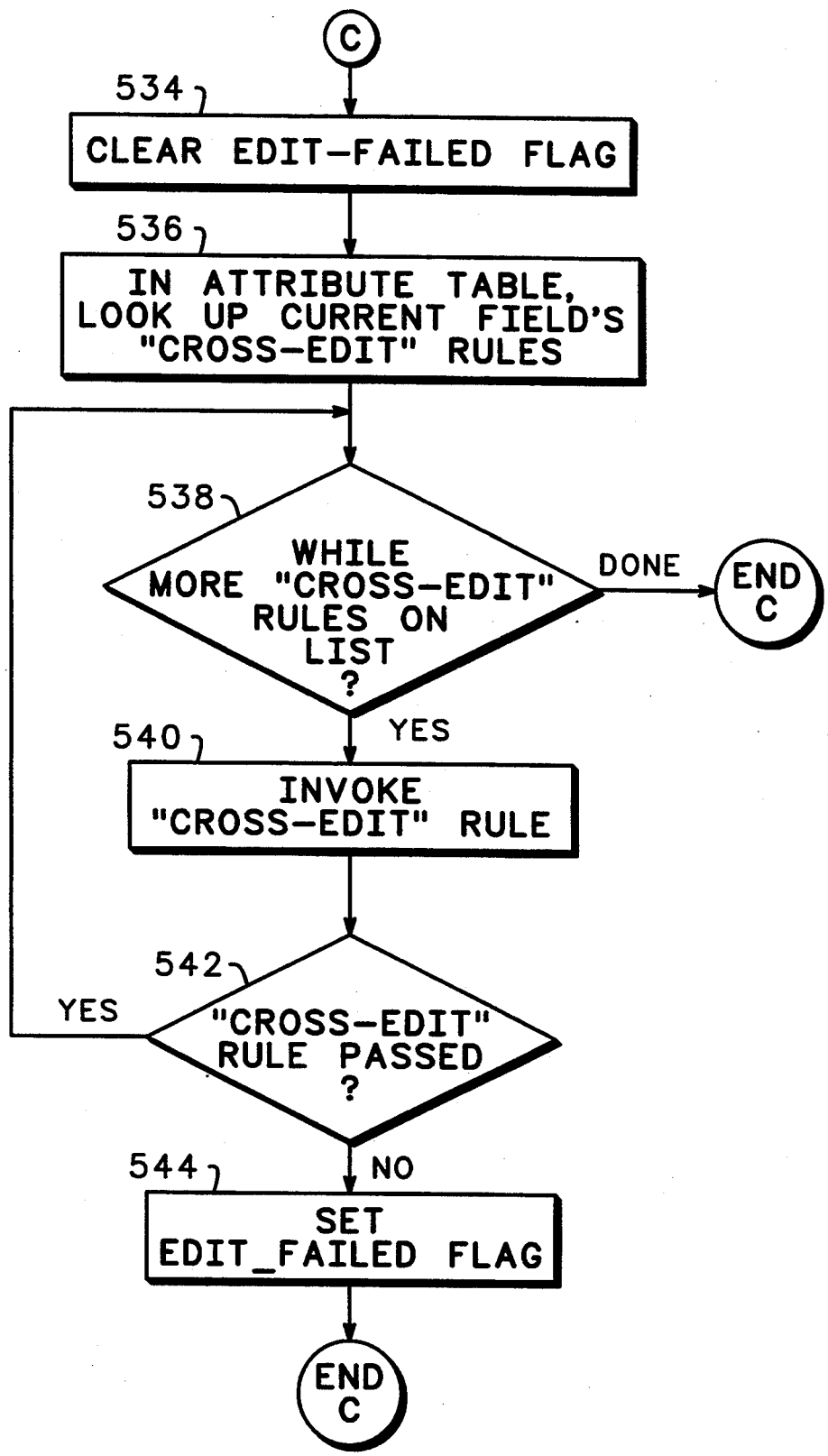

In FIG. 18D, Routine C begins by entering box 534 where the Edit_Failed flag is cleared. Next in box 536, the current field's CROSS-EDIT rules are looked up in the Attribute Table, and the routine proceeds to loop box 538.

In loop box 538, if there are more CROSS-EDIT rules on the list, the routine proceeds to box 540; but if not it exits. In box 540 the particular CROSS-EDIT rule is invoked.

Then the routine goes to decision box 542; if the CROSS-EDIT rule passed, the routine returns to enter loop box 538, but if not it goes to box 544, where the Edit_Failed flag is set, whereupon Routine C exits.

It will be apparent to those skilled in the art that the disclosed invention may be modified in numerous ways and may assume many embodiments other than the preferred form specifically set out and described above.

For example, the division of functionality between the graph manager and the forms manager may be altered in different ways, so that one may perform functions described herein as performed by the other, and vice versa.

Accordingly, it is intended by the appended claims to cover all modifications of the invention which fall within the true spirit and scope of the invention.

GRAPH TABLE

| Graph Name | Source Node | Event | Destination Node |
|---|---|---|---|
| f_adt | graph_init | INIT | s_census |
| f_adt | s_census | INDEX | f_index |
| f_adt | f_index | CENSUS | s_census |
| f_adt | f_index | READMIT | s_census |
| f_adt | null_node | SHUTDOWN | graph_exit |
| f_index | graph_init | INDEX | s_index |
| f_index | s_index | SHOWDETAIL | s_demo |
| f_index | s_index | REVIEWCHART | n_openchart |
| f_index | s_index | ADMIT | s_adt |
| f_index | s_index | CENSUS | graph_exit |
| f_index | s_demo | RETURN | s_index |
| f_index | n_openchart | RETURN | s_index |
| f_index | s_adt | RETURN | s_index |
| f_index | s_adt | READMIT | graph_exit |

ATTRIBUTE TABLE

| Attr Name | Attr Type | Default Rule | List Rule | Calc Rule | Edit-sf Rule(s) | Edit-cf Rule(s) |
|---|---|---|---|---|---|---|
| who | STAFFID | d_cur_id | | | e_nurseid, e_activeid | |
| bdate | DATE e_cf_age | | | | e_bdate | |
| age | AGE_T e_cf_bdate | | | | | |
| io_sum | IO_SUM | | | c_ios(io_in, io_out) | | |
| dname | NAME_T e_cf_docid | | l_docs | | e_docname, e_active_d | |
| dr_id | STAFFID e_cf_docn | | l_docids | | e_docid, e_active_d | |

ATTRIBUTE TYPE TABLE

| Attr Type | Parent Type | Edit |
|---|---|---|
| STAFFID | INTID | e_valid_staffid |
| INTID | integer | e_valid_intid |
| DATE | long | e_valid_date |
| AGE_T | integer | e_valid_age |

-continued

ATTRIBUTE TYPE TABLE

| Attr Type | Parent Type | Edit |
|---|---|---|
| IO_SUM | float | |
| NAME_T | char* | |

APPENDIX A

GLOSSARY

Arc = a transition between nodes representing an event.

Attribute = a field within an object class, e.g. patient i.d.

Attribute name = an identifier by which the attribute is selected.

Attribute table = a table containing the definition of every attribute in the entire system, including the associated attribute name, calculation procedure, default procedure, edit procedure (single-field edits, cross-field edits), list procedure, transform procedures, and type name.

Attribute type = defines physical characteristics of an attribute.

Blackboard = an area of memory reserved for use by the nodes of the current directed graph. All of a graph's imports and exports are stored in its blackboard until the procedure exits from the graph.

DECL's = Default, Edit, Calculation, and List procedures. These are associated with attributes, not with specific applications. An attribute may have any combination of DECL's (or no DECL's) associated with it.

Calculation procedure = defines a way of deriving the value of an attribute based on other information in the database. Initiated when a value is entered into the database (by the user or otherwise) for one of the triggers associated with the calculation procedure.

Default procedure = loads a value into a field on a form automatically when the field has been selected for entry. The default procedure determines the default value, if any, for an attribute.

Edit procedure = defines a set of validity constraints, or edit rules, for one or more attributes. An edit rule contains an attribute specifier (since an edit procedure may be associated with more than one attribute), a Boolean expression that represents the edit rule, and an error message to display if the edit rule fails.

Single-field edits = initiated whenever new data is entered for the attribute on a form.

Cross-field edits = initiated for any field which has received new data on a form whenever the OK, MORE, or SIGN actions are selected by the user. It is also initiated for any fields designated in the form definition as REQUIRED if that field has been enabled for entry. They are used to check consistency between the field they are associated with and other data in the database (e.g. that the dose, concentration, and amount of an IV drip are consistent).

List procedure = used to select a subset of list elements, based upon some algorithm, from a superset of possible list elements. The superset is defined in a list table. A list procedure is invoked whenever the associated field is selected and enterable.

Dialog node = interacts with the forms manager to control data display and entry. Makes requests to the forms manager to display data on various forms and receive notification of various events.

Event = generated as a result of an action, either triggered by user action or as an incoming graph arc to the node.

Export = individual node or graph can export data.

Forms manager = translates user actions into events and sends those events to the graph manager.

Graph = the coordinating logic of an application is expressed as a set of function graphs.

Directed graph = same as a function graph.

Exit graph = the last node in a graph, it copies its graph's export values from its blackboard to the calling graph's blackboard and pops the blackboard stack. It handles a graph's export attributes.

Function graph = a set of nodes and interconnecting arcs. Permits an application to be divided into a number of independent but cooperating parts. Each node on the graph has a self-contained function that it performs when invoked.

Graph manager = coordinates execution of an application expressed as a directed graph, including screening incoming events, calling DECL's at appropriate times, handles dialog node sequencing, and import/export. data flow.

Graph table = entries in a table in a database that describe a function graph. They describe the sequencing between graph nodes and between graphs. Each entry in the graph table contains a source node name, an arc name (event), a destination node name, and the name of the graph containing the source node.

Initialization graph = the first node in a graph, it is a graph manager function that sets up the current graph's blackboard. When invoked, it creates a blackboard, copies the graph's imports onto the blackboard, and pushes the blackboard onto the blackboard stack. It handles a graph's import attributes.

Nested graphs = a graph containing a sub-graph.

Sub-graph = a graph comprising two or more nodes contained in a node of a graph.

Import = individual node or graph can import data.

List = a set of predefined choices for entry into a field.

MORE = the user selects the "MORE" icon on the form to request more information to be retrieved from the system for display on the form.

NEW = the user enters new data into a field.

Node = A portion of a function graph that performs a well-defined function when invoked. Nodes are interconnected by arcs representing events. Nodes specify what actions are to be carried out for each of these events. Each node in a function graph is structured as an event processor. The body of the node is an event loop, processing each incoming event in sequence, until the loop exits.

Object action = a well-defined set of operations that modifies the data structures associated with an object instance to reflect an event in the real world (e.g. create a physician's order; chart a medication).

Object class = a logical collection of data attributes which describe a class of items in the real world (outside of the system) and which are treated as a unit; e.g. Vital Signs (includes all related objects, such as Respiratory Rate, Blood Pressure, Heart Rate, Reflexes, etc.).

Object instance=each physical item that is being tracked by the system is represented by an instantiation of the appropriate object class.

OK=the user indicates he/she is done with this particular pop-up form.

SIGN=the user commits to the data he/she has entered.

Trigger=one of the independent variables in the equation that calculates the target attribute.

APPENDIX B

PSEUDO-CODE

Event Loop (Graph Mgr)
Case DEFAULT:
In attribute table, look up the default proc for the current attribute.
If the default proc exists, call it.
Break (next event).
  Case NEW:
    In the attribute table, look up the current field's attribute type and edit rules.
    In the attribute type table, look up the current field's attribute type and that of all its parents, and get all the edit rules.
    Call all the edit rules found in order.
    If any one of the edit rules fails Break (next event).
  Else (all edits passed)
    In the attribute table, look up the calculation rules triggered by the current attribute.
    For each such calculation rule, call it and any calculation it triggers.
    Pass the NEW event on to the current dialog node.
Break (next event).
Case CROSS_EDIT:
In the attribute table, look up the current field's cross-edit rules.
Call all the crossedit rules found in order.
If any one of the crossedit rules fails Break (next event).
Break (next event).
Case OK:
Case SIGN:
Case MORE:
If any of the previous edits failed (this takes care of case where forms manager sends a slew of cross_edit events followed by an ok, sign, or more event)
  Ignore this event
Else
  Pass the event on to the dialog node.
  Break (next event).
Default:
Pass the event on to the dialog node.
Break (next event).

What is claimed is:

1. A method performed by a computer with an input means, the method comprising the steps of:
    (a) storing an attribute identifier, an attribute-specific procedure identifier and an attribute type identifier in an attribute table entry in an attribute table;
    (b) storing the attribute type identifier, a type-specific procedure identifier and a parent type identifier in a first type table entry in a type table;
    (c) storing the parent type identifier as a second attribute type identifier and a parent type-specific procedure identifier as a second typespecific procedure identifier in a second type table entry in the type table;
    (d) executing an application program that obtains data entered by a user via the input means; and
    (e) executing a separate program upon determining that the data entered by the user in step (d) is an attribute having the attribute identifier stored in the attribute table, the execution of the separate program including the steps of:
        (e1) locating the attribute identifier in the attribute table;
        (e2) determining the attribute type identifier stored in the attribute table entry in the attribute table that stores the attribute identifier located in step (e1);
        (e3) determining the parent type identifier in the first type table entry that stores the attribute type identifier;
        (e4) executing a parent type-specific procedure identified by the parent type-specific procedure identifier stored as the second type-specific procedure identifier in the second type table entry that stores the parent type identifier determined in step (e3) as the second attribute type identifier;
        (e5) executing a type-specific procedure identified by the typespecific procedure identifier stored in the first type table entry that stores the attribute type identifier determined in step (e2); and
        (e6) executing an attribute-specific procedure identified by the attribute-specific procedure identifier stored in the attribute table entry in the attribute table that stores the attibute identifier located in step (e1).

* * * * *